(12) United States Patent
Kidd

(10) Patent No.: US 8,565,922 B2
(45) Date of Patent: Oct. 22, 2013

(54) APPARATUS AND METHOD FOR ASSISTING IN ACHIEVING DESIRED BEHAVIOR PATTERNS

(75) Inventor: Cory D. Kidd, Hong Kong (CN)

(73) Assignee: Intuitive Automata Inc., Shatin, NT (HK)

( * ) Notice: Subject to any disclaimer, the term of this patent is extended or adjusted under 35 U.S.C. 154(b) by 665 days.

(21) Appl. No.: 12/492,910

(22) Filed: Jun. 26, 2009

(65) Prior Publication Data
US 2010/0023163 A1    Jan. 28, 2010

Related U.S. Application Data

(60) Provisional application No. 61/076,407, filed on Jun. 27, 2008.

(51) Int. Cl.
*G05B 15/00* (2006.01)
*G05B 19/00* (2006.01)

(52) U.S. Cl.
USPC .......................... 700/259; 700/245; 700/246

(58) Field of Classification Search
USPC ............. 700/245–265; 901/1–50; 446/97, 85, 446/139, 137, 142, 141, 268–367
See application file for complete search history.

(56) References Cited

U.S. PATENT DOCUMENTS

| | | | | |
|---|---|---|---|---|
| 4,235,437 A * | 11/1980 | Ruis et al. | ........................ | 482/5 |
| 4,571,682 A * | 2/1986 | Silverman et al. | ............ | 600/301 |
| 4,853,854 A * | 8/1989 | Behar et al. | .................... | 700/295 |
| 4,857,030 A * | 8/1989 | Rose | ............................. | 446/303 |
| 4,923,428 A * | 5/1990 | Curran | ........................ | 446/175 |
| 5,388,043 A * | 2/1995 | Hettinger | ....................... | 600/300 |
| 5,673,691 A * | 10/1997 | Abrams et al. | ................ | 600/300 |
| 5,732,232 A * | 3/1998 | Brush et al. | .................... | 715/751 |
| 5,802,488 A * | 9/1998 | Edatsune | ....................... | 704/231 |
| 5,853,292 A * | 12/1998 | Eggert et al. | .................. | 434/262 |
| 5,938,531 A * | 8/1999 | Yasushi et al. | .................. | 463/36 |
| 5,944,533 A * | 8/1999 | Wood | ............................. | 434/322 |
| 6,026,322 A * | 2/2000 | Korenman et al. | ........... | 600/547 |
| 6,089,942 A * | 7/2000 | Chan | ............................. | 446/175 |
| 6,175,772 B1 * | 1/2001 | Kamiya et al. | .................. | 700/31 |
| 6,253,058 B1 * | 6/2001 | Murasaki et al. | ............. | 434/308 |

(Continued)

OTHER PUBLICATIONS

Kidd, Cory D., et al, "Designing a Social Robot System for Weight Maintenance", *2006 3rd IEEE Consumer Communications Networking Conference*, Jan. 8, 2006, pp. 253-256, XP002542623, I-4244-0086-4/06.

(Continued)

*Primary Examiner* — Bhavesh V Amin
(74) *Attorney, Agent, or Firm* — Sunstein Kann Murphy & Timbers LLP

(57) ABSTRACT

A method and system for assisting an individual in achieving a desired pattern of behavior. A robot is provided that includes a moving head and eyes and is programmed to make eye contact with the individual, such robot also having an interface for communicating with the individual. The robot includes a relationship management module that measures state of a relationship with the individual to determine a current state of the relationship. The robot also includes an interaction module that implements a behavior model for the robot's interaction with the individual. The behavior model causes a change in interaction of the robot with the individual based on what the relationship management module determines to be the current state of the relationship, so that the behavior model assists the individual in effecting the pattern of behavior.

16 Claims, 19 Drawing Sheets

(56) References Cited

U.S. PATENT DOCUMENTS

| | | | |
|---|---|---|---|
| 6,347,261 B1 * | 2/2002 | Sakaue et al. | 700/245 |
| 6,358,201 B1 * | 3/2002 | Childre et al. | 600/300 |
| 6,422,871 B2 * | 7/2002 | Shepherd | 434/236 |
| 6,478,736 B1 * | 11/2002 | Mault | 600/300 |
| 6,529,887 B1 * | 3/2003 | Doya et al. | 706/12 |
| 6,554,679 B1 * | 4/2003 | Shackelford et al. | 446/268 |
| 6,629,242 B2 * | 9/2003 | Kamiya et al. | 713/100 |
| 6,635,015 B2 * | 10/2003 | Sagel | 600/300 |
| 6,682,390 B2 * | 1/2004 | Saito | 446/268 |
| 6,773,344 B1 * | 8/2004 | Gabai et al. | 463/1 |
| 6,778,191 B2 * | 8/2004 | Diederiks et al. | 715/706 |
| 6,816,802 B2 * | 11/2004 | Kim et al. | 702/131 |
| 7,200,249 B2 * | 4/2007 | Okubo et al. | 382/118 |
| 7,333,969 B2 * | 2/2008 | Lee et al. | 706/52 |
| 7,363,108 B2 * | 4/2008 | Noda et al. | 700/245 |
| 7,409,267 B2 * | 8/2008 | Doi et al. | 700/245 |
| 7,689,319 B2 * | 3/2010 | Kanda et al. | 700/245 |
| 7,750,223 B2 * | 7/2010 | Ohshima et al. | 84/470 R |
| 7,853,357 B2 * | 12/2010 | Sawada et al. | 700/250 |
| 7,957,837 B2 * | 6/2011 | Ziegler et al. | 700/258 |
| 2002/0156751 A1 * | 10/2002 | Takagi et al. | 706/12 |
| 2004/0117063 A1 * | 6/2004 | Sabe et al. | 700/245 |
| 2005/0049850 A1 * | 3/2005 | Porter | 704/1 |
| 2005/0149229 A1 * | 7/2005 | Doi et al. | 700/245 |
| 2007/0073631 A1 * | 3/2007 | Hinchey et al. | 706/14 |
| 2007/0198128 A1 * | 8/2007 | Ziegler et al. | 700/245 |
| 2009/0079816 A1 * | 3/2009 | Qvarfordt et al. | 348/14.16 |

OTHER PUBLICATIONS

Kidd, Cory D., "Designing for Long-Term Human-Robot Interaction and Weight Loss", *Massachusetts Institute of Technology*, Feb. 2008, pp. 1-132, XP002542624.

International Searching Authority, International Search Report and Written Opinion, PCT/US2009/048920, dated Sep. 2, 2009.

Kidd, Cory D., "Designing for Long-Term Human-Robot Interaction and Weight Loss", *Massachusetts Institute of Technology*, Aug. 1, 2008, pp. 1-132, XP002542624.

Hanson, et al., "Reliability Generalization of Working Alliance Inventory Scale Scores," Educational and Psychological Measurement, vol. 62, No. 4, pp. 659-673, Aug. 2002.

\* cited by examiner

Calories Consumed Today

| Lunch | 85 | Change | Delete |
| Breakfast | 360 | Change | Delete |
| Snack | 70 | Change | Delete |
| Dinner | 500 | Change | Delete |

Add  Done

*FIG. 18*

Calories  0
Meal  ---

1  2  3
4  5  6
7  8  9
Clear  0

Breakfast  Lunch  Snack  Dinner

OK  Cancel

*FIG. 19*

APPARATUS AND METHOD FOR ASSISTING IN ACHIEVING DESIRED BEHAVIOR PATTERNS

CROSS REFERENCE TO RELATED APPLICATIONS

The present application claims priority to U.S. Provisional Application No. 61/076,407, filed Jun. 27, 2008, which application is hereby incorporated by reference herein in its entirety.

TECHNICAL FIELD

The present invention relates to robots, and more particularly to robots designed to assist individuals in achieving desired behavior patterns.

BACKGROUND ART

It is known in the prior art to use a nutritionist or dietitian in order to receive advice on dietary habits in order to improve health and well being and take steps to prevent or combat disease. Medical facilities often provide such assistance through individuals who have undergone professional training and have received certification or licensing to practice in the field. It may prove difficult financially or inconvenient to consult personally with such an individual on a daily basis, particularly if one is not already receiving specific medical treatment. Additionally, many individuals seeking to improve their dietary and health behavior patterns often need reminders and an accountability system in order to maintain good habits, keep track of their progress and develop discipline related to dietary and health concerns. While simply maintaining a written record may allow an individual to monitor dietary habits, such a task may prove onerous and does not provide a level of interactivity and accountability that would motivate some to maintain consistent and proper habits. Machine-based dietary aids in the prior art include those described in U.S. Pat. Nos. 3,980,866 and 4,303,854.

SUMMARY OF THE INVENTION

In accordance with a first embodiment of the invention there is provided a method of assisting an individual in achieving a desired pattern of behavior. The method of this embodiment includes providing to the individual a robot, the robot including moving head and eyes and programmed to make eye contact with the individual, such robot also having an interface for communicating with the individual, such interface including at least one of a display, a speech interface, and physical movement of the robot. The robot provided in the method includes a relationship management module that measures the state of a relationship with the individual to determine a current state of the relationship. The robot further includes an interaction module that implements a behavior model for the robot's interaction with the individual, such behavior model causing a change in interaction of the robot with the individual based on what the relationship management module determines to be the current state of the relationship, so that the behavior model assists the individual in effecting the pattern of behavior. Optionally, the behavior model causes a change in interaction of the robot with the individual based also on one or more other factors such as the time of day or the length of time since the last interaction.

In a related embodiment the pattern of behavior relates to health of the individual.

In a further related embodiment the pattern of behavior relates to desired weight loss of the individual.

In another related embodiment the desired pattern of behavior is long-term behavior.

In another embodiment of the present invention, there is provided a system for assisting an individual in achieving a desired pattern of behavior. The system includes a robot, the robot including moving head and eyes and programmed to make eye contact with the individual, such robot also having an interface for communicating with the individual, such interface including at least one of a display, a speech interface, and physical movement of the robot. The robot includes a relationship management module that measures state of a relationship with the individual to determine a current state of the relationship. The robot also includes an interaction module that implements a behavior model for the robot's interaction with the individual, such behavior model causing a change in interaction of the robot with the individual based on what the relationship management module determines to be the current state of the relationship, so that the behavior model assists the individual in effecting the pattern of behavior. Optionally, the behavior model causes a change in interaction of the robot with the individual based also on one or more other factors such as the time of day or the length of time since the last interaction.

In a related embodiment the pattern of behavior relates to health of the individual.

In a further related embodiment the pattern of behavior relates to desired weight loss of the individual.

In another related embodiment the desired pattern of behavior is long-term behavior.

BRIEF DESCRIPTION OF THE DRAWINGS

The foregoing features of the invention will be more readily understood by reference to the following detailed description, taken with reference to the accompanying drawings, in which:

FIG. 18 is an exemplary calorie entry page displayed in accordance with an embodiment of the present invention. This shows four entries for the currently selected day by the user. From here, the user can edit or remove an entry, add a new entry, or move on to the next part of the interaction.

FIG. 19 illustrates an interface screen display to allow a user to enter information on their calorie consumption in accordance with an embodiment of the present invention.

DETAILED DESCRIPTION OF SPECIFIC EMBODIMENTS

Definitions. As used in this description and the accompanying claims, the following terms shall have the meanings indicated, unless the context otherwise requires:

"Long-term" behavior of a user shall mean behavior of the user over an extended period of time, so that the behavior is regarded by the user and others as characteristic of the user and not temporary.

A "speech interface" of a robot is an interface permitting at least one-way communication using spoken words from the robot to a user.

A "relationship state" in the context of a user using an assistive robot in accordance with an embodiment herein means a characterized behavior mode of the user in relation to the robot. In one embodiment, we identify relationship states of initial, normal, and repair.

Aspects of the present invention are described in the Ph.D. thesis of the present inventor, Cory D. Kidd, entitled "Designing for Long-Term Human-Robot Interaction and Application to Weight Loss", available in the Library System of the Massachusetts Institute of Technology, Cambridge, Mass. 02139 and also publicly available at the following link: http://www.intuitiveautomata.com/documents/KiddPh-DThesis.pdf. This thesis is hereby incorporated herein by reference in its entirety.

Figure 27:
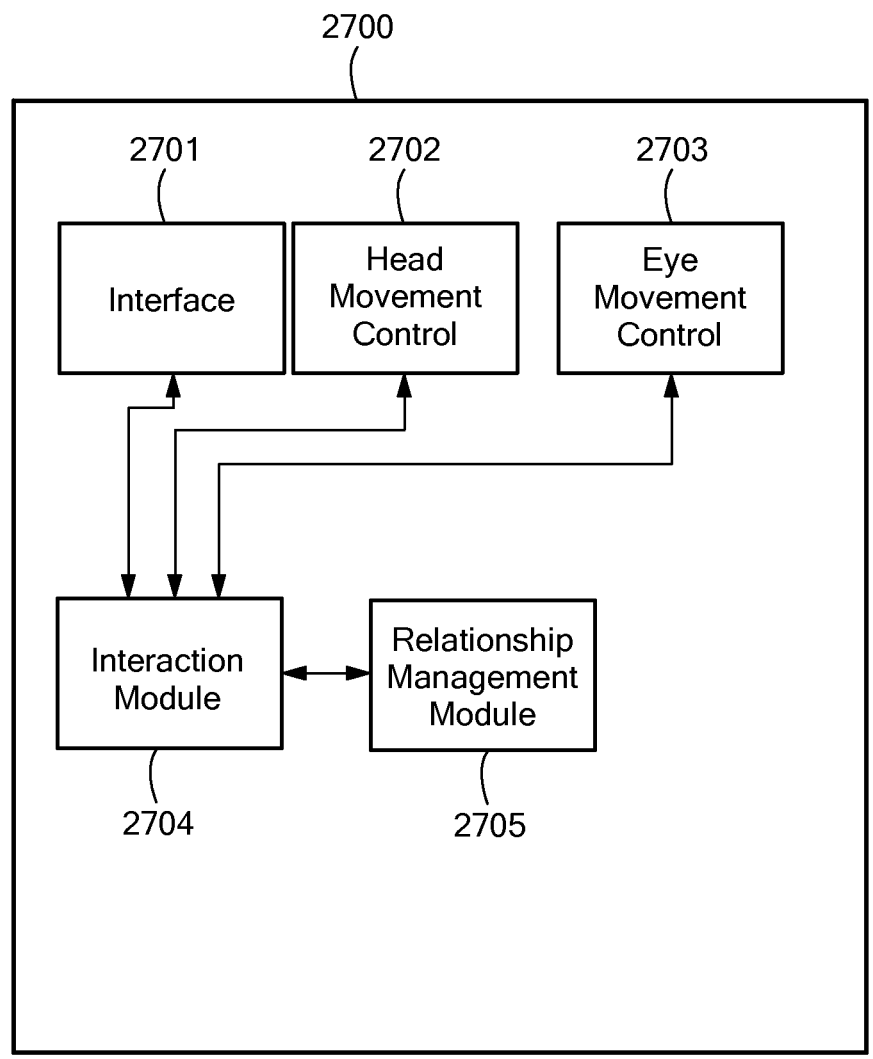
FIG. 27 illustrates a system in accordance with an embodiment of the present invention.

FIG. 27 illustrates a system in accordance with an embodiment of the present invention. The system illustrated demonstrates the components of the robot 2700 that allow the robot to assist an individual in achieving a desired pattern of behavior. The system includes control modules 2702 and 2703. Module 2702 controls the head motion of the robot as further detailed below in the application. Module 2703 controls the eye movements of the robot based in part on the observation taken by a camera located within robot 2700. Component 2701 represents an interface, which may include any or all of a display interface, speech interface, or physical movement system, to enable the robot to communicate with a user and receive input from the user. Each of the systems 2701-2703 may bi-directionally communicate with interaction module 2704. Interaction module 2704 is coupled to systems 2701-2703 and is also coupled to the relationship module 2705. In response to input from any of systems 2701-2703, the interaction module may provide one or more of these systems to produce audible, textual, or physical responses including possible eye movement and head movement. Interaction module 2704 implements a behavior model to determine what the specified responses may be and to instruct the robot's interaction with the individual. The behavior model causes a change in the interaction of the robot with the individual based on the state of the relationship. The state of the relationship is determined by relationship management module 2705, which determines a state based on inputs received from the interaction action module.

Figure 1:
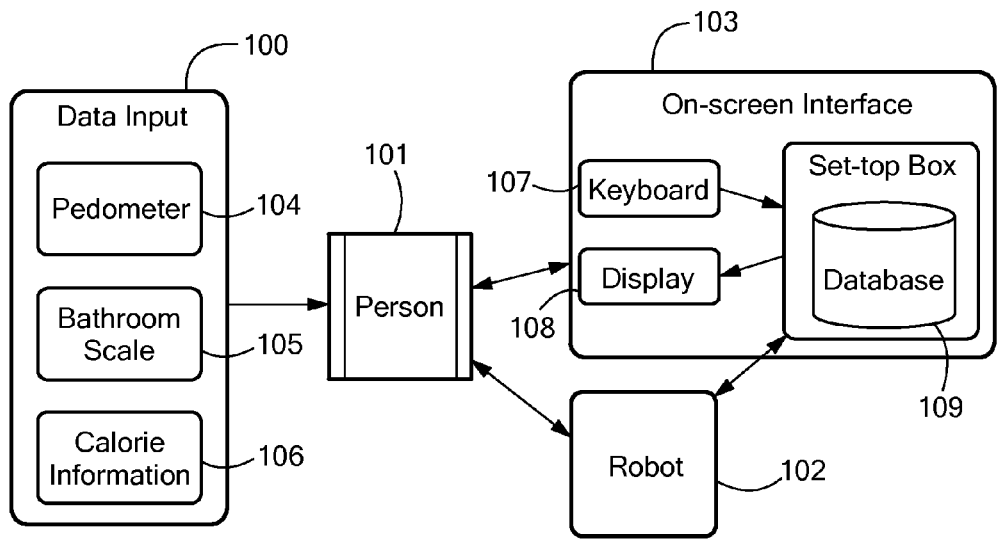
FIG. 1 is a block diagram illustrating the interactions between a person and an embodiment of the present invention. Data is collected directly by the robot as well as possibly through other components. The on-screen interface on the robot's display interacts with the back-end scripts, framework, and database to properly manage information display and user input. The robot interacts directly with the user using this screen, audio, and movement.

FIG. 1 provides a block diagram demonstrating interactions between a user 101 and an embodiment of the present invention, namely robot 102. When using an embodiment of the present invention the user will generally input data in process 101. The data is collected directly by the robot as well as possibly through other components. For example the robot may be configured to interact with components such as a pedometer 104, a bathroom scale 105, or a scale 106 that measures calorie information. Once a user interacts with one of these components, the user may input the data into the robot. If the component is directly connected to the robot, via an electrical connection, the data may be transferred to the robot directly from the component. The user may also interact with interface 103, generally provided on the robot to input data in the robot. For example, if a relevant one of the components is not connected to the robot, then the user may manually enter such data into robot 102 using the interface. Additionally, the user may interact with the interface to input personal data or select options during other interactions with the robot. The interface may include a keyboard 107 and a display 108, both of which may be coupledd to database 109, which stores user data. The robot interacts directly with the user using this display or screen, as well as through audio components, and movements performed by the robot. The display may be a touch screen display, which allows the user to easily enter data or make selections.

Figure 2:
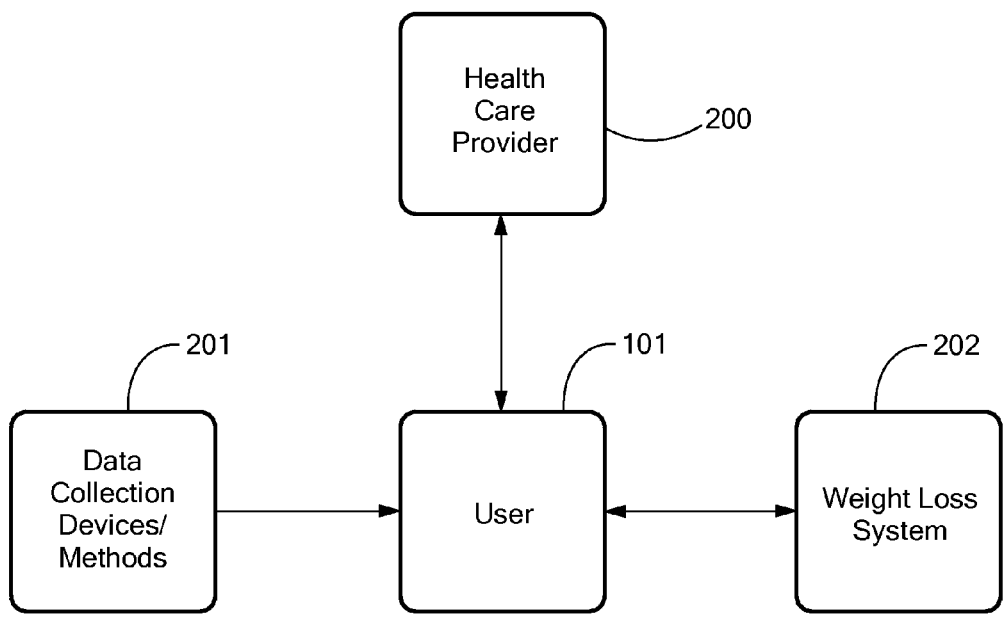
FIG. 2 is a block diagram illustrating how a robotic system (in this case labeled "weight loss system") in accordance with an embodiment of the present invention fits into the larger context of the behavior change it is helping to effect. The user also often (but not always) has professional help and ways outside of the robotic interface to keep track of relevant information. These external components may or may not interact in some way directly with the robotic system.

FIG. 2 is a block diagram illustrating how a robotic system (in this case labeled "weight loss system") in accordance with an embodiment of the present invention fits into the larger context of the behavior change it is helping to effect. The user also often (but not always) has professional help and ways outside of the robotic interface to keep track of relevant information. These external components may or may not interact in some way directly with the robotic system. For example, the robot may be connected to the health care provider 200 through a network such as the internet to send and receive information about the user's progress directly to the robot or weight loss system 202. Alternatively, the health care provider may simply interact with the user providing advice and getting updates and the user may use this information to further interact with the weight loss system, for example by setting criteria and goals or to make certain dietary selections such as recommended calorie intake. The user may additionally use data collection devices 201 to monitor their progress or status, which information may be provided by the user to the health care provider 200 and to the weight loss system.

Figure 3:
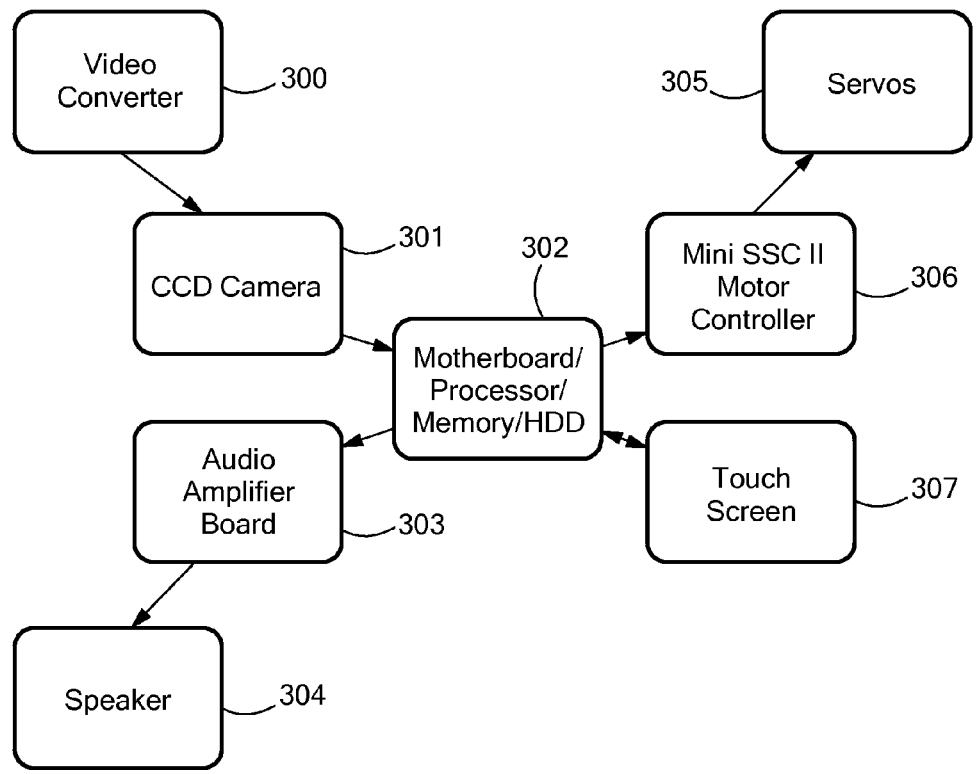
FIG. 3 is a block diagram illustrating hardware components that may be used as part of an interactive sociable robot system used to effect long-term behavior change in accordance with an embodiment of the present invention.

FIG. 3 is a block diagram illustrating hardware components that may be used as part of an interactive sociable robot system used to effect long-term behavior change in accordance with an embodiment of the present invention. Theses components allow the robot to interact with a user and generally include a video converter 300, a camera 301, a processor 302, an audio amplifier 303, a speaker 304, servos 305, controllers 306, and a display and input device, touch screen 307. While some of these components may be optional and while additional components may be provided, theses components afford the robot the ability to visually monitor the user and respond visually, audibly, and physically to the user's responses based on this monitoring.

Figure 4:
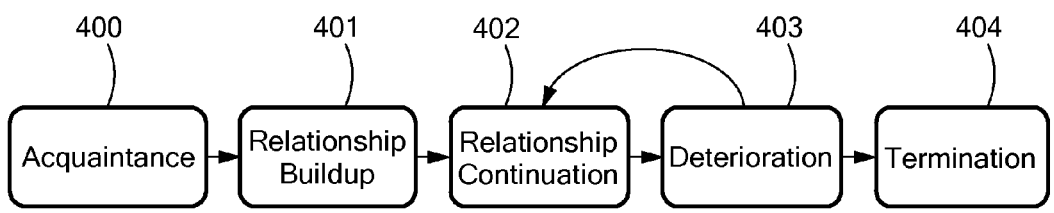
FIG. 4 is a block diagram illustrating the basic relationship model upon which the coaching system is built in accordance with an embodiment of the present invention. These five relationship phases come from models of human psychology and are used in the robot to determine the appropriate behavior during a given interaction.

FIG. 4 is a block diagram illustrating the basic relationship model upon which the coaching system is built in accordance with an embodiment of the present invention. These five relationship phases come from models of human psychology and are used in the robot to determine the appropriate behavior during a given interaction. The robot may develp an acquaintance with the user in phase 400 using the tools described with reference to FIG. 3. Through this acquantence and monitoring the relationship between the user and the robot may be enlarged in phase 401 as the robot continues to make decisions about the user. This relationship continues in phase 402 as the database of information continues to grow, but as noted by phase 403 may deterioate based on additional information or lack of interaction with the robot over a period of time. Such a relationship may eventually be terminated in phase 404.

Figure 5:
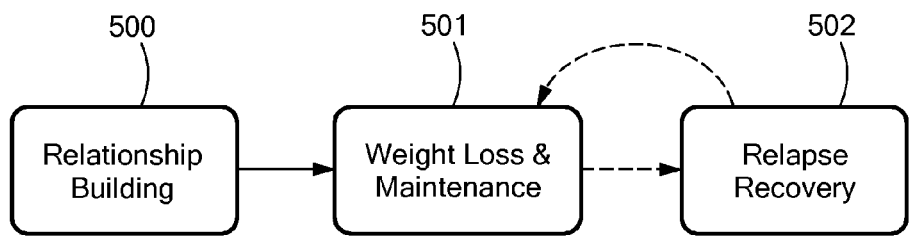
FIG. 5 is a block diagram illustrating the trajectory of most relationships with the weight loss coach in accordance with an embodiment of the present invention. Individuals first build up a relationship with the system and then the system attempts to maintain that relationship over time in order to help the person sustain their weight loss progress. There are also behaviors that are appropriate for getting a person back on a weight loss program (or other long-term behavior change) if there has been a lapse between sessions.

Individuals first build up a relationship with the system and then the system attempts to maintain that relationship over time in order to help the person sustain their weight loss progress. As demonstrated by FIG. 5 the relationship built with the robot represented by phase 500 allows the user to loose or maintain certain weight standards 501 and may provide an effective means for recovery in phase 502 through certain interactions if the user begins relapsing into bad habits or behavior.

Software Design

Figure 6:
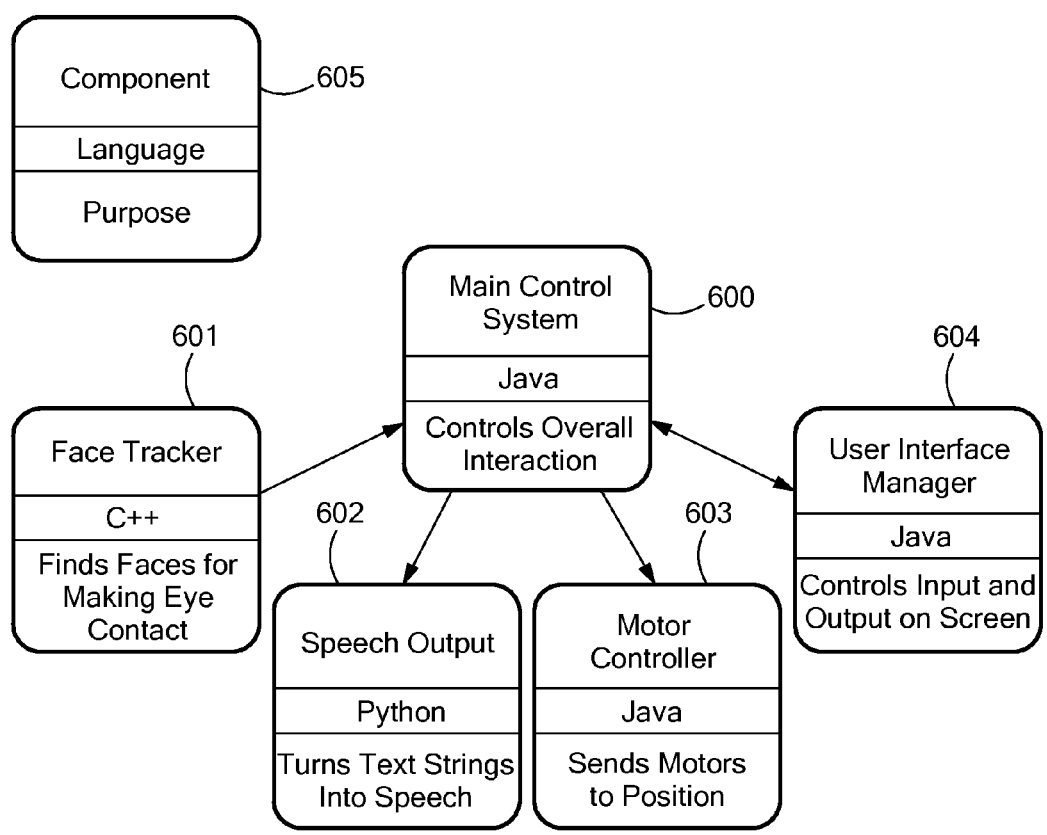
FIG. 6 is a block diagram illustrating the overall software system architecture as implemented in the prototype used in field trials in accordance with an embodiment of the present invention.

FIG. 6 is a block diagram illustrating the overall software system architecture as implemented in the prototype used in field trials in accordance with an embodiment of the present invention. In accordance with this embodiment of the present invention, there are five main pieces of software that create the interactions between the weight loss coach system and the user. As noted by template 605 each software box represented shows the component that the system controls, a language that may be used to implement the software component and the purpose for each component. While these components are demonstrated as using specific languages other programming languages may be used such as Ruby or Java and those languages may be implemented through various operating systems such as the Android platform. The main piece of software 600 coordinates all input and output, maintains the overall state of the interaction and relationship with the user, and handles the flow of interaction based on input from the user. There are four peripheral pieces of software as well: the motor control system 603, the vision system 601, the speech output server 602, and the user interface controller 604. Each of these five software components is discussed further in the remaining description.

Control System Architecture

The main software system handles the control flow of an interaction and the communication between all subsystems. The overall software system architecture as implemented in the prototype used in field trials is depicted in FIG. 3. This central piece of software is written in Java and either instantiates subsystems as other Java classes (as with the motor control and user interface) or uses sockets to communicate with them (the face tracker and speech output).

Figure 16:
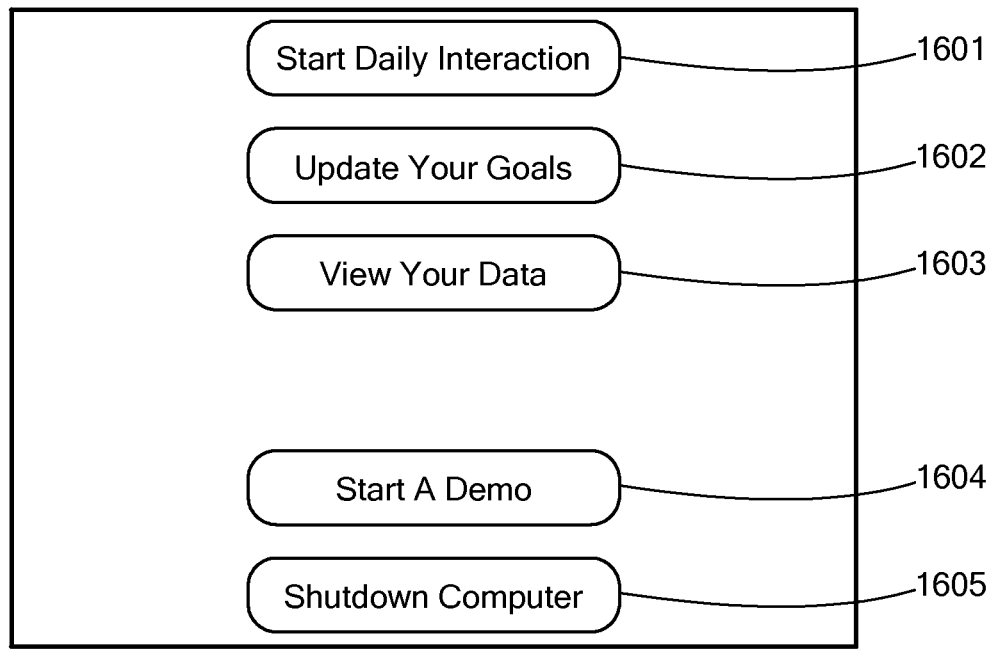
FIG. 16 illustrates a main menu screen displayed on prototype robot weight loss coach in accordance with an embodiment of the present invention. From top to bottom, the buttons will: (1) begin the normal interaction mode between the user and robot, (2) allow the user to update their calorie and exercise goals with the system, (3) directly view graphs showing their calorie and exercise data over the past week, (4) show a demonstration interaction with the robot without revealing their actual data, and (5) turn off the entire system.

FIG. 16 illustrates a main menu screen displayed on a robot weight loss coach in accordance with an embodiment of the present invention. Button 1601, Start Daily Interaction, allows the user to begin the normal interaction mode between the user and robot. Button 1602, Update Goals, allows the user to update their calorie and exercise goals with the system. Button 1603, View Your Data, directly views graphs showing the user's calorie and exercise data over the past week. Button 1604, Start A Demo, shows a demonstration interaction with the robot without revealing their actual data. Button 1605, Shutdown Computer, allows the user to turn off the entire system. The basic control flow is driven by the user. The user can select an option from the initial menu (shown in FIG. 16), which then chooses the appropriate script to be run. The first, Start Daily Interaction, is what the user does most frequently. This interaction and how it is performed is described in detail below. Update Goals allows the user to enter or modify their daily exercise and calorie goals. Based on what is known about weight loss and maintenance, the user should have some goal towards which they are working, which is what this system is designed to support. The View Data option lets the user go directly to graphs of their exercise or calorie entries for the previous seven days. More information on what is shown for these graphs is below in the description of the full interaction. Start Demo lets a person show off the capabilities of the system without revealing their data on exercise or calorie consumption. This is implemented to allow study participants to show family members and friends who may be curious about the robot how it works without having to display their personal data. Finally, Shutdown the Robot is a button which exits the software and powers down the entire hardware and software system.

Figure 17:
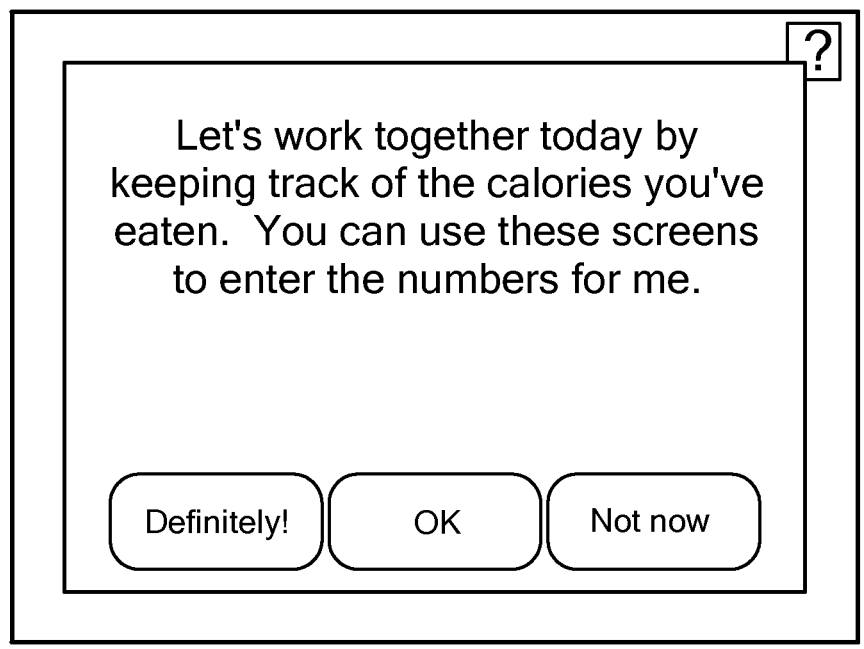
FIG. 17 illustrates a screen showing text as part of an interaction with the user in accordance with an embodiment of the present invention. The robot speaks the text aloud and simultaneously displays the information on the screen. Users can touch the buttons on the screen in reply.

FIG. 17. illustrates a screen showing text as part of an interaction with the user in accordance with an embodiment of the present invention. The robot speaks the text aloud and simultaneously displays the information on the screen. Users can touch the buttons on the screen in reply.

The following two subsections give an example of an interaction followed by details of how this interaction is implemented in software.

Daily Interaction—Example.

When the user starts the robot, the user gets the main menu shown in FIG. 16. When they select Start Daily Interaction, the system greets them by speaking aloud and displaying any text that is spoken aloud on the screen as shown in FIG. 17. At the bottom of any screen of text, there are one or more responses that the user can select in order to continue the interaction. When there are three options (the most common situation), one is usually neutral in affect (e.g. "OK"), one is positive (e.g. "Thanks!" or "That was helpful!"), and one is negative (e.g. "I didn't want to hear that." or "Let's just move on."). The options given are based on the text spoken and displayed on the screen. The robot then makes a little small talk based on the time of day and how long it has been since the last interaction. It then introduces the data gathering portion of the interaction by saying something like "I would like you to tell me about your eating and exercise so far today," followed by asking the user about their calorie consumption. It then shows a screen like the one in FIG. 18, at which point the user can enter any calories consumed during the day. FIG. 18 is an exemplary calorie entry page displayed in accordance with an embodiment of the present invention. This shows four entries for the currently selected day by the user. From here, the user can edit or remove an entry, add a new entry, or move on to the next part of the interaction.

After the user presses the "Done" button on the enter calories screen, the robot offers to let them enter information from a previous day. For users with the system in their homes who have missed a day or remember something from a past day that they haven't put in, this gives them the option of entering data for up to three previous days. After finishing the calorie entry, the same kind of interaction and a similar set of screens are used to gather information about exercise. A user can enter exercise either in number of minutes spent exercising or number of steps taken if they are using the pedometer that was given to them as part of the system. After completing the exercise entry for the current day and any previous days, the robot thanks the user by saying something meant to be encouraging like "Thanks for the information. That will help us in reaching your goals."

Next the system offers to show the user graphs of their recent activity. If the user chooses to view these graphs, they get the option of seeing a graph of calorie consumption or of exercise. After choosing a graph, the system first gives feedback based on the day's activities (e.g. "Good job meeting your calorie goal today! You're doing even better than the goal you set for yourself." or "You haven't quite met your exercise goal yet today. Do you think you could keep working on that?") and then shows the graph. The graph is a simple bar graph like the one shown in FIG. 20 and contains seven days of information chronologically with the current day at the right. There is also a line across the graph showing the current goal that the user has set. After pressing the "Done" button, the robot returns to the screen giving the graph options, allowing the user to choose to see another graph or to continue the interaction.

Once the user finishes viewing the graphs, the system next offers a suggestion about diet, exercise, or nutrition. These suggestions are based on recent data that the person has entered, with the system attempting to choose a piece of advice that might be most helpful to the user at the time. Next the system tells the user that it wants to ask them a couple of questions. These questions are from a short version of the working alliance inventory (short form) scale. The question is displayed on the screen and spoken aloud. The screen also shows a sliding scale (shown in FIG. 23 on which the user can indicate how much they agree or disagree with the statement. After answering the first question, the robot says something like "Thanks for the answer. Just one more question today," and offers the second question. The robot then thanks the user for answering the questions.

Finally, the robot makes a little more small talk to encourage the user to continue using the system. This frequently takes the form of asking for commitment to return the following day with a statement like "I hope to see you again tomorrow. Will you be able to come back?" and offers response options such as "Certainly," "I'll try," or "Maybe." After the user chooses a response the robot says goodbye and thanks them for talking with it. After a few seconds it returns to the main screen and lowers its head and eyes in a subtle imitation of sleep as an indication of finishing the interaction.

Daily Interaction—Implementation.

The control flow of the interaction is the most complicated part of the software system created for the robot. The basic flow is written to be easily modifiable, which allows for rapid changes based on early and ongoing feedback that was solicited on the interactions with the system. There are a number of factors that can change what the robot says or does at a given instant.

Figure 7:
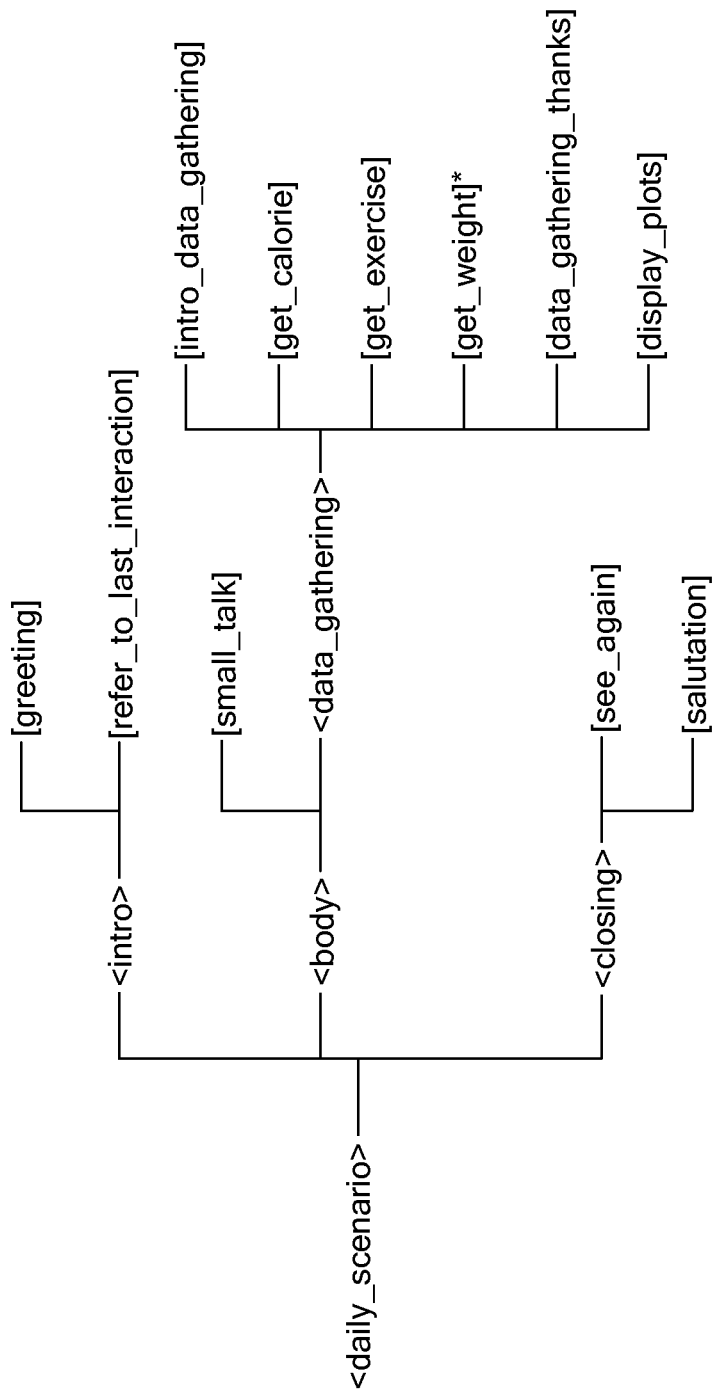
FIG. 7 is tree graph illustrating an example script that is used to generate an entire interaction between the robot and the person in accordance with an embodiment of the present invention.

All interactions are driven based on scripts and data in several databases that were loaded prior to the user beginning to use the robot and created as a result of the interactions. When a user selects an action from the main menu, the system chooses a script appropriate to that particular interaction. Scripts are made up of a set of tags that recursively generate the full, detailed interaction script using a Backus-Naur Form grammar. An example script used to create a daily interaction is shown in FIG. 7. In this figure, each terminal tag (a tag without another tag to the right of it) is executed by the robot. Each tag can be one of three types: a recursive tag, a terminal tag, or a generated terminal tag. The first, the \emph {recursive tag}, simply generates a new set of tags that are then sequentially processed by the system. An example shown in the daily interaction is <daily_scenario>, which generates a set of tags <intro>, <body \rangle$, and <closing>. A terminal tag is one that calls a piece of code to perform some action, such as the [get_calorie], which uses the same set of screens each time to gather data. The final type, a generated terminal tag, generates the text and/or action to be performed in real-time based on the sequence of events leading up to the call in the current interaction as well as data stored in the database. An example of this tag is the [intro_data_gathering] tag, which generates an appropriate phrase based on time of day and relationship state.

The decision of what a particular generated terminal tag will create is based on several factors. Simple ones are time of day (e.g. "Good morning" versus "Good evening") and time since last interaction (e.g. "Good to see you back again. I'm glad we're getting a chance to talk" versus "Thanks for coming to talk to me today.") Somewhat more complex is the state of the relationship, which is calculated to be in one of three states based on the WAI-SF responses. This state can be initial, normal, or repair, and the calculation of the state is described below. If the state is initial, the system uses language that is more explanatory in nature. For example, instead of simply saying "Can you tell me how much you have eaten and exercised today." the robot might add something like "It will help us to reach your goals if we keep track of what you do each day." In the normal state, the system uses relatively short forms of dialogue as in the example interaction given above. In the repair state, it uses meta-relational dialogue with the user. To introduce the questions about gathering data, it would say something like "Let's work together to keep track of your progress toward your goals" or "Thanks for the information. It helps us to work together to meet your goals" after getting information from the user.

Calculating Relationship State

The relationship state can be either initial, normal, or repair. Initial is used for the first few days of interaction, so there is no calculation to be made. The Working Alliance Inventory—Short Form (WAI-SF) consists of eight questions and the robot rotates through the questions, asking two each day, thus repeating every four days during daily use. Currently the initial state is used for four days. The normal state is then used for four days. Starting at the ninth day (or ninth interaction), the system calculates a score based on the following formula:

$$WAI_{state} = \frac{\sum_{day=-3}^{0} (WAI_{day})}{8} - \frac{\sum_{day=-7}^{-4} (WAI_{day})}{8}.$$

The result is an average difference in responses on a scale of 0 to 600 (the range for any one question). If the $WAI_{state}$ is greater than −25 (allowing for minor variation in responses or UI input error), the relationship state is deemed normal. If the result is less than −25 (i.e. the responses to questions are in general lower over a period of time), the relationship state is set to repair.

Aspects of the Interactions

As a result of these calculations and generation of interactions, the dialogue that is generated between the robot and the user is extremely unlikely to be the same for any two interactions during the six-week study. This variety makes the system seem more capable of interacting with the user and much less likely to bore the user during the weeks of continuing interaction.

The robot also performs small gestures throughout the interaction in addition to looking at the user. When introducing a part of the interaction where a response on the screen is expected, the robot will look away from the user and glance down at the screen as a subtle indication to the user that their attention is expected there at that particular time.

Every response from the user—data on calories and exercise that is entered, WAI-SF questions answered, and responses to each piece of dialogue—are recorded in an interactions database. Some of this is used later, such as in calculating the relationship state. All of it is available post-experiment for analysis of the interactions and correlation with other information collected in questionnaires before and after the study.

Motor Control System

The motor control software subsystem for this robot is relatively simple and is split into two Java classes. The hardware controller is a Mini SSC II from Scott Edwards Electronics that connects to the robot via a serial interface. We created a small Java class that abstracts the operation of the hardware and has an interface that takes as input two integers: a motor number and a position. When instantiated, it opens a connection to the serial port on the robot and maintains that connection for as long as the robot is running. Upon receiving a command, it sends the updated position(s) directly to the hardware motor controller.

The second class has a basic model of the robot's four degrees of freedom and movement in order to properly handle movement with the robot's capabilities. This class allows software limits for each degree of freedom in the robot to be designated in order to provide protection against trying to push part of the robot beyond its physical limits. (For example, the neck left/right motion might have a minimum extent of 47 and a maximum of 212 within the motor's unrestrained physical range of 0 to 255.) This interface also allows a maximum speed for each degree of freedom to be set. This is accomplished by assuring that a movement update will not be sent per instruction cycle time greater than the maximum allowed range for one period of time. The frequency of updates to the hardware can also be controlled from this class. (For example, if the updates to the physical robot are being sent at 10 updates per second and the maximum movement per second for a degree of freedom is 20, no update should be more than +/−2 from the current position.)

Computer Vision

The vision system on our robot is running the face tracking portion of the open source OpenCV engine. The face tracker is implemented in C++ as a standalone piece of software that is automatically run when the robot boots up. This software allows multiple faces to be detected and sends out an (X, Y) coordinate set for each face found in a video frame over a socket. The main control system has code that is constantly listening for any output from the vision system and handles the input when necessary.

Figure 15:
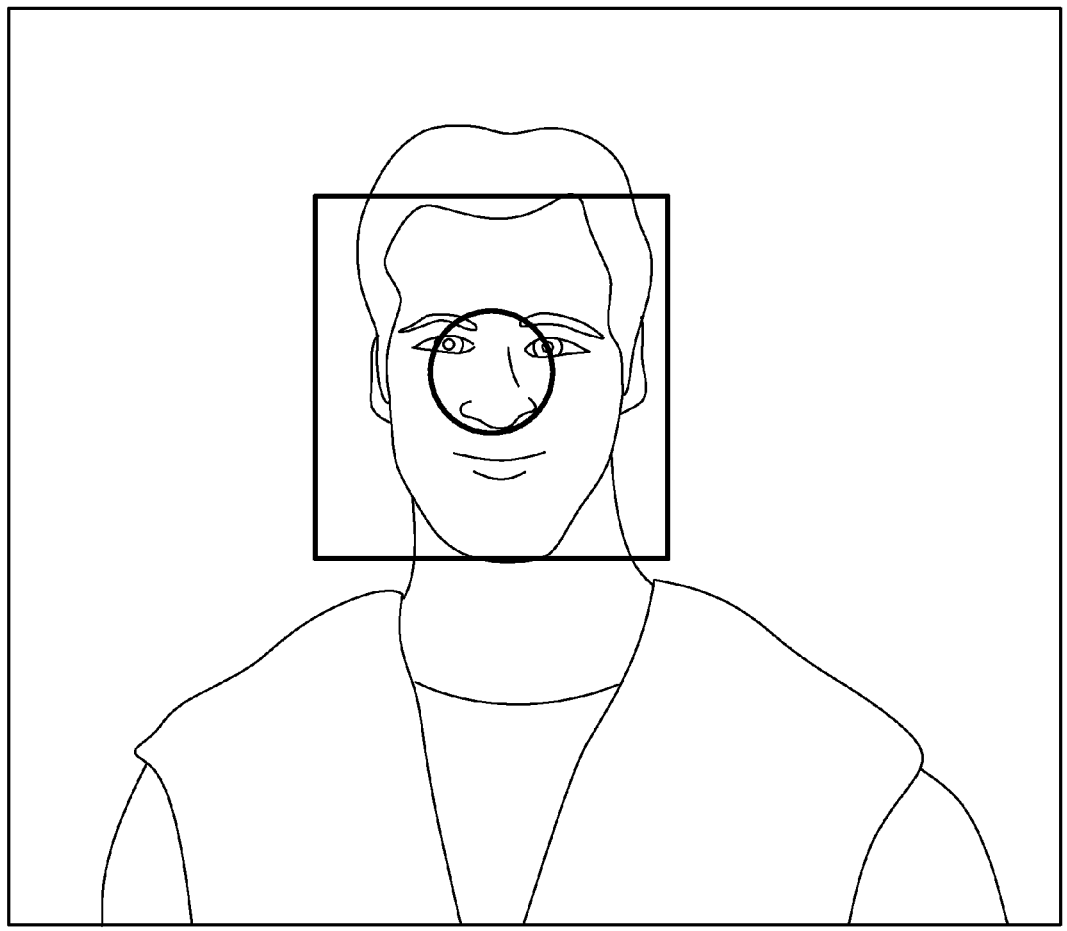
FIG. 15 is a view providing an example of face tracking software locating a face in order to direct the robot's eyes in accordance with an embodiment of the present invention.

The action that the face tracker takes depends on the current mode of the robot. In most situations, the robot is attempting to maintain eye contact with the user. This is done using the fact that the camera position on the robot is in the center of the forehead between the eyes (see FIG. 9) and when the eyes are looking straight ahead and a face from the face tracker is found to be in the center of the image, it appears to a user as though the robot is looking at them. (There is a slight offset used to account for the camera being above the line of the eyes, but this is accounted for in the motor controller code.) An offset might also be accounted for in the embodiment wherein the camera is positioned within one of the robots eyes. Thus the tracker simply has to center the face in its vision system to give the appearance of matching the gaze of a user. An example of what the face tracker sees is demonstrated in FIG. 15. The red square indicates a face that is detected (more than one of these may be seen on a screen). The green circle shows where the robot is currently looking and may or may not correspond with a face on any given frame of video, depending on current tracking behavior and physical movement progress across frames.

The actual tracking algorithm is more complicated than simply sending the appropriate command to the neck left/right and up/down motors that would center the face. If this were the action performed, the robot would appear to be very "jerky" and not at all human-like. We know that humans looking at a person in a similar situation would quickly perform a saccade with their eyes, followed nearly instantaneously with movement of the head. When we mimic this exactly on a robot, we still get an effect where the movement appears to be too rapid. When the eyes follow the person quickly, followed by an exaggeratedly slow movement of the neck, this appears to be more appropriate to an observer. Thus when a new face position is detected, the robot calculates four independent motor trajectories to accomplish this movement, two for each of the degrees of freedom in the eyes and two for each in the neck. The speeds used for the eyes are much faster than that of the neck, resulting in the desired difference in movement speeds.

Once these movement trajectories are calculated, the high-level motor control begins sending outputs to the low-level motor controller. This process of calculating trajectories is then immediately repeated a few milliseconds later with the newest position from the face tracker. This allows for correct updates if the person is moving while the robot is in the process of looking to a new face position of the user quickly enough for it not to be noticed by the person.

There are two challenges in using the OpenCV face tracking system. In any environment with visual clutter, it frequently picks up fleeting false positive faces that may appear for a frame or two (50 to 500 milliseconds depending on the current processor load and over how many frames the false positive lasts). There is also no identification or ordering of faces, which means that when more than one face is detected, there is no output that labels faces consistently from one frame to the next (e.g. if two faces are detected, it might send the coordinates of person A followed by person B in one frame and in the reverse order in the very next frame). Both of these potential problems are handled by implementing a maximum movement distance between frames. From simple calculations based on measurements of actual human movement in front of the robot, we calculated a maximum likely movement between frames of vision output. This is taken into account in the vision system by ignoring any face detected outside of a window defined with a center of the last face position detected and the bounds of maximum likely movement in any direction. If no face is detected within that window for a given period of time, the entire camera frame may be used again for finding new faces.

Speech Output

The speech capabilities of the system were created using an off-the-shelf text-to-speech (TTS) software package. Microsoft's TTS engine, SAPI5, and the Mary voice were chosen for their ease of use and the fact that it is freely available on the Windows platform that is used in an embodiment of the invention. This was combined with the pyTTS module for python which provides a wrapper around the SAPI interface.

The resulting system written in Python was built as a standalone server that is started when the robot starts. It listens on a particular port for strings of text to be passed to it. Upon receiving a text string, it uses the SAPI interface to convert the text into speech and plays the result over the robot's speakers.

User Interface

Figure 20:
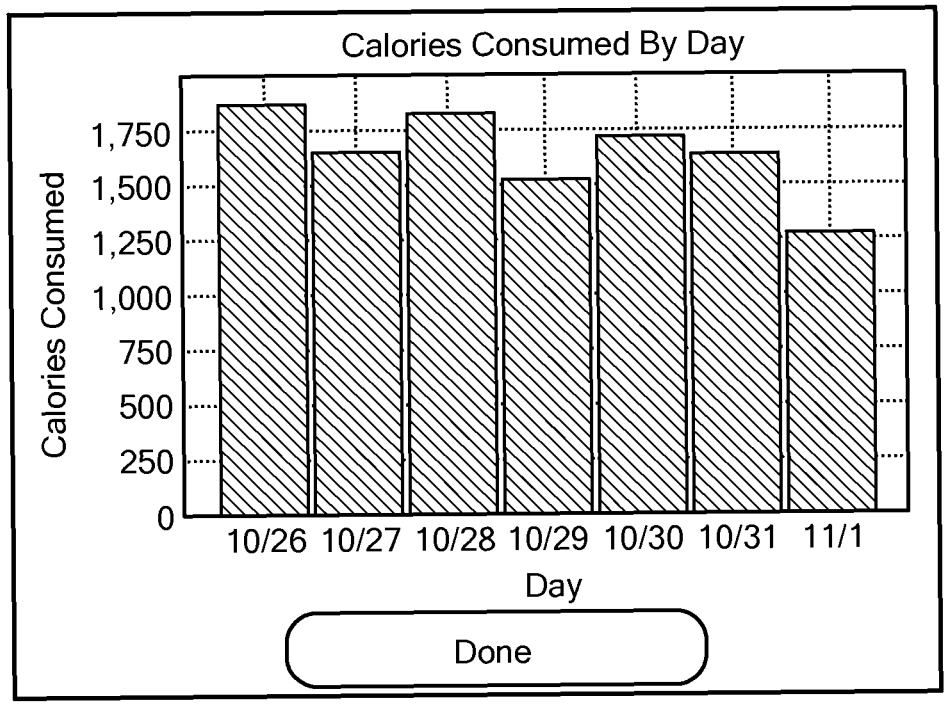
FIG. 20 illustrates a graph displayed on the robot of a user's recorded calorie intake over a one-week period in accordance with an embodiment of the present invention.
Figure 21:
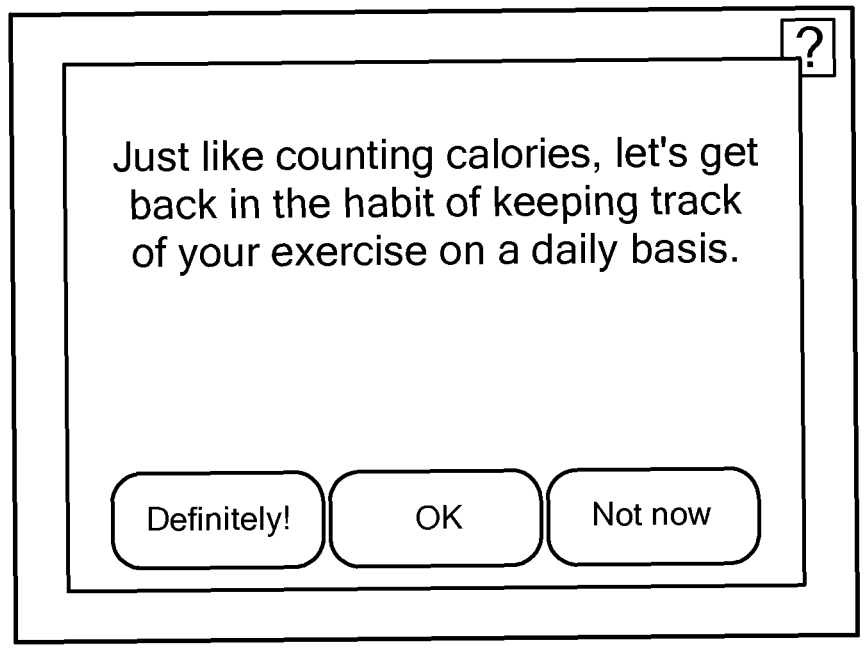
FIG. 21 is an exemplary dialog screen showing the robot introducing the exercise recording portion of an interaction in accordance with an embodiment of the present invention.
Figures 22, 23:
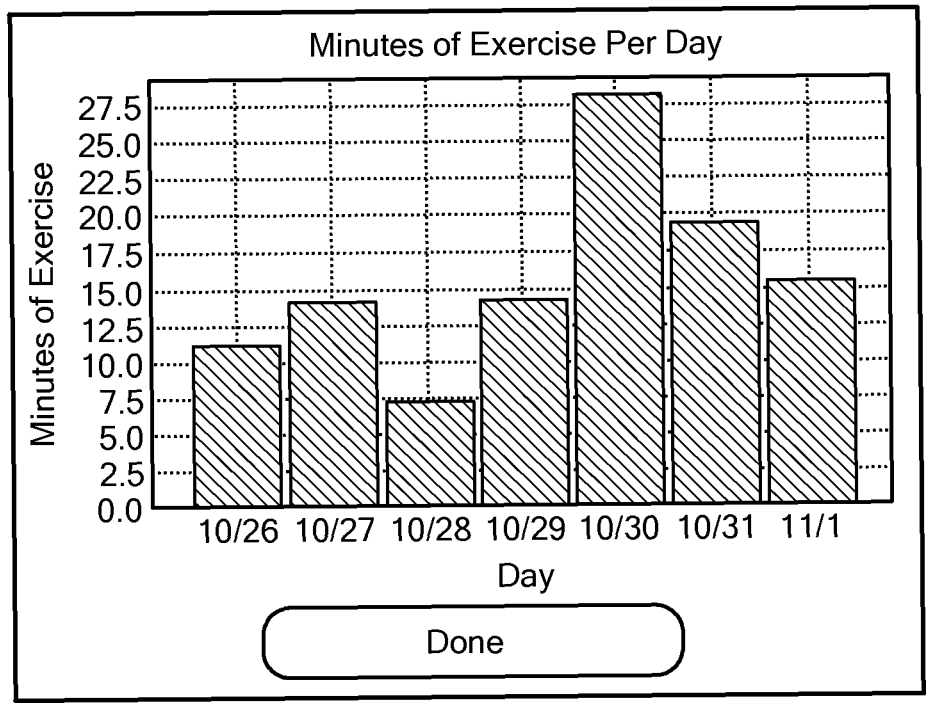
FIG. 22 is an exemplary graph displayed on the robot showing a user's recorded exercise information over a one-week period in accordance with an embodiment of the present invention. The line across the graph indicates the current daily goal set by this user.
FIG. 23 is an exemplary interface screen allowing the user to answer the robot's questions about the interaction on a sliding scale in accordance with an embodiment of the present invention.

The user interface (UI) code is woven tightly into the main control code, but is a separate piece that manages all of the input and output to the touch screen on the front of the robot. The main function of this code is to take a message that should be displayed to the user on the screen (such as a piece of text, a question, or a menu), format the item for display. An example menu is shown in FIG. 16 and an example statement requesting user input is shown in FIG. 17. There is also a set of screens that allow the user to enter calorie and exercise information. An example screen showing data entered for a day with the option to enter more is shown in FIG. 18 and the screen to enter new calorie data is seen in FIG. 19. Similar screens exist for entering exercise information. FIGS. 20 and 22 demonstrate graphs that may be used to show a user's activity over the past week. FIG. 20 shows the user's calorie consumption on a day-by-day basis for a 7-day period, while FIG. 22 shows the amount of exercise the user achieved on a day-by-day basis for a 7-day period. Such results assist the user in visually tracking progress and may be provided over longer or shorter periods as desired.

The UI is written in Java using the Swing toolkit. All of the code was developed for this particular robot and the type of output screens were created based on the needs of the interaction for weight loss and weight management. The actual content of most screens is parameterized so that the main control code can determine the text or data to be shown on a given screen at runtime.

Hardware Design

Overall Design

The overall design of the robot was created with several factors in mind:

We wanted to utilize off-the-shelf computer components and hobby servos to make the construction process faster, so the size and shape of each of these existing components had to be taken into account.

We wanted to minimize the number of degrees of freedom in order to make construction simpler and improve the lifetime reliability of the robot to prevent (or minimize) repairs while robots were in homes.

A figure suggestive of a human was desired. We also wanted to give the robot a slightly feminine appearance.

A touch screen was needed as input so that we did not have to rely on speech recognition.

Moving eyes were a key feature for initially engaging a user in the interaction.

Moving Components

The robot has four degrees of freedom: neck up/down, neck left/right, eye up/down, and eye left/right. The eyes are coupled together so that their motion is always paired; the lack of vergence is not noticed with this robot design. This is a simple way to give a full circular range of motion for both neck and eyes, giving the robot the ability to follow a person within a reasonably large area in front of it. Based on these principles, early sketches were drawn up and turned into a solid model that could be checked for fit and dimension. From this a first prototype of the head components were created and the structure was assembled. After testing this assembled head, the design was slightly revised for both the eyes and the neck to allow for better range of motion with the head shells on and a final design was created.

Electronics

Most of the electronic components for the robot were purchased from PC and RC hobby companies. The computer components of a robot consist of an ATX motherboard, a 3

GHz Pentium processor, 1 GB of RAM, a 320 GB SATA hard drive, and an ATX regulated power supply. There is a Mini SSC II 8-channel servo controller from Scott Edwards Electronics that connects to the computer via serial interface and directly to each servo and the power supply. There is a small CCD camera from Supercircuits mounted in the head that is connected to a KWorld video converter to digitize its output. This is in turn connected to a USB port on the motherboard. There is a small speaker for audio output connected to an audio amplifier board. A PCI slot fan is used on the side of the robot to prevent overheating of the main area that contains the processor. Finally, the touch screen is a 7" VGA touch screen from Lilliput Electronics (China). The display takes input from the VGA output of the motherboard and sends touch position output via USB.

Structural Components and Shells

The main internal structure of the robot is built from polycarbonate for strength and durability. All of the other components of the robot are mounted off of this frame.

This structure consists of a base, an upright component, and a top, along with six supports for assembly. There are six shell pieces that are attached to the structure and cover most of the internal components: two head shells, two neck shells, and two body shells. The construction of each of these is described in the next section.

Construction Process

This section describes and illustrates the construction process for each of the components of the robot.

Frame

The internal frame consists of nine components and is cut on the water jet from polycarbonate based on drawings from a SolidWorks model. This frame is structurally sturdy and all other components of the robot are attached to it. It rests on four rubber feet that elevate it slightly to allow for airflow through vents on the bottom and to protect any surface from being scratched by the screws used for assembly.

Head

Figure 12:
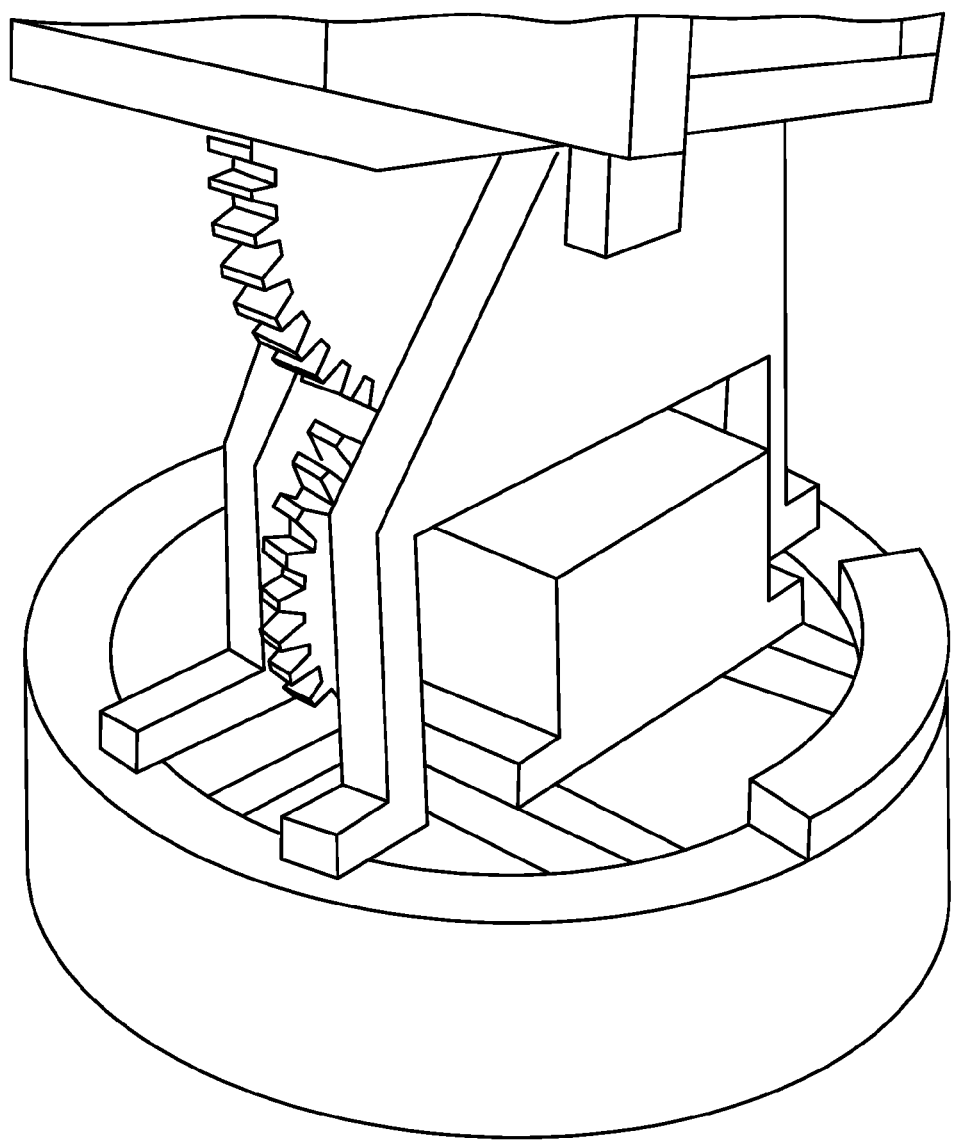
FIG. 12 is a close-in view of the neck mechanism of the prototype robot of FIG. 11 showing 2 degrees of freedom (left/right and up/down) of the neck of the robot.
Figure 13:
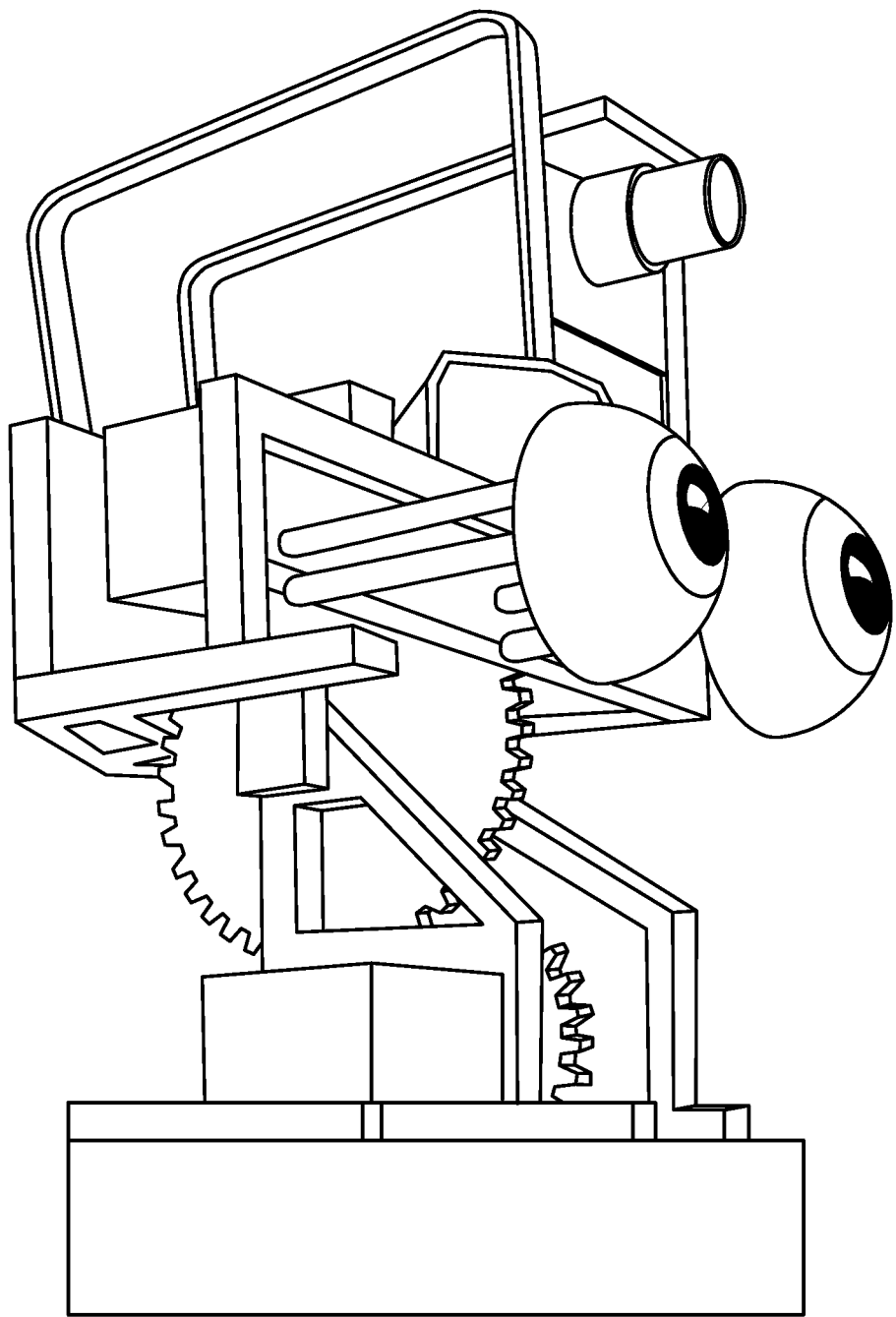
FIG. 13 is a side view of the prototype robot head of FIG. 11 with no shells on. The eye and neck mechanisms can be seen here with all four degrees of freedom (neck up/down, neck left/right, eyes up/down, and eyes left/right). The camera can be seen mounted above the eyes.

The head and neck assembly is the most mechanically complicated portion of the robot. The two degrees of freedom (DOF) in the neck are driven by CS-70MG (metal gear) and CS-30MG hobby servos, which are reasonably powerful, compact servos. The metal gears (as opposed to plastic) make the servo more durable. These two DOFs are direct-drive gears, as seen in FIG. 12. The left/right servo is mounted to the main portion of the head, which rests on small rollers above the neck. The shaft of this servo has an aluminum gear attached to it and this gear is mated to a larger gear that is mounted in the base of the neck, which in turn is attached directly to the frame of the robot with four screws. Turning this servo turns the head in the opposite direction. The up/down servo is mounted to this main portion of the head next to the left/right servo. It has an aluminum gear attached to it which mates with a half-round gear that is attached to the upper portion of the head. Turning this servo directly moves the head up or down.

The upper portion of the head has two CS-12MG servos mounted in a frame. These are connected to the eyes through T-shaped aluminum pieces. The base of the T is connected to a servo and then connected to the eye mechanism in a position that is offset from center. The up/down servo is connected above the center and the left/right servo is connected to the side of center. Each of these is offset from the center axis of the eye by approximately half an inch, allowing for direct control of each axis by pushing or pulling on the rod connecting the servo to the eye assembly.

All components of the head were constructed based on the solid model. Most components are made of aluminum and were cut on a water jet. Parts of the base that hold the upper portion of the head in place and the cross mechanism to which the eyeballs are attached were made of clear acrylic and were cut on a laser cutter. All pieces were finished (sanding and filing) by hand and assembled by hand. Each head has approximately 140 components.

Body Shells

The shape of the shells was initially modeled in software. The models were then cut at 1.5" intervals vertically and the cross-section for each of these pieces was printed and cut from dense foam. The pieces were then glued together and alternately coated in plastic and sanded and then coated in silicone.

This mold was then used to thermoform pieces of PETG plastic. The resulting plastic shells were then cut out from the full sheet of plastic, all cutouts and holes were created, and the piece was painted.

Head and Neck Shells

Creating the shells for the head and neck was a lengthy multi-step process. Two-piece molds for each of the four pieces (head front, head back, neck front, neck back) were created in software, resulting in eight pieces. Then one-piece molds for each of these pieces were created. Each of these molds was then printed on a ZCorp Z510 3D printer. The four larger molds had to be broken into four pieces each because of limitations in reliability of the printer that would not allow for pieces of the desired size to be printed.

After the molds were prepared, silicone was mixed and poured or injected into each of the eight full molds. The pieces pulled out of these molds were then a set of four pairs of silicone molds that could then be used to make each of the four plastic parts needed as shells for the robot.

These molds were cleaned up and acrylic boxes were created to hold the neck molds so that they would not deform while being used. Batches of plastic were mixed one at a time and poured into a pair of molds. The poured plastic pieces were removed from the molds after setting for four to six hours, cleaned, sanded, and painted.

After preparing all of the plastic pieces, they were attached to the frame of the head and body of the robot.

Eyes

The final part of the robot that was created was the eyes. Each eye actually consisted of 8 parts: the eyeball, an acrylic cross-piece mounted inside the eye, and a combination metal and plastic ball-and-socket joint that was screwed into the cross-piece and the arms attached to the T-mounts as described above. The eyeballs are made from half-sphere acrylic domes. They were painted in three coats (white, brown, and black) and then covered with a clear spray-on acrylic coat for protection. Each eye has a cross-bar mount attached on the inside. This mount has three screw-on mount points, one at the center axis for attachment to the frame, one offset to the top for the up/down servo attachment, and one offset to the side for the left/right servo attachment. The attached eyes 1100 can be seen in FIG. 11 where some of the eye and neck mechanisms are also illustrated. The square mounting bracket 1101 at the top is for the camera in an embodiment of the invention.

Full Assembly

Figure 11:
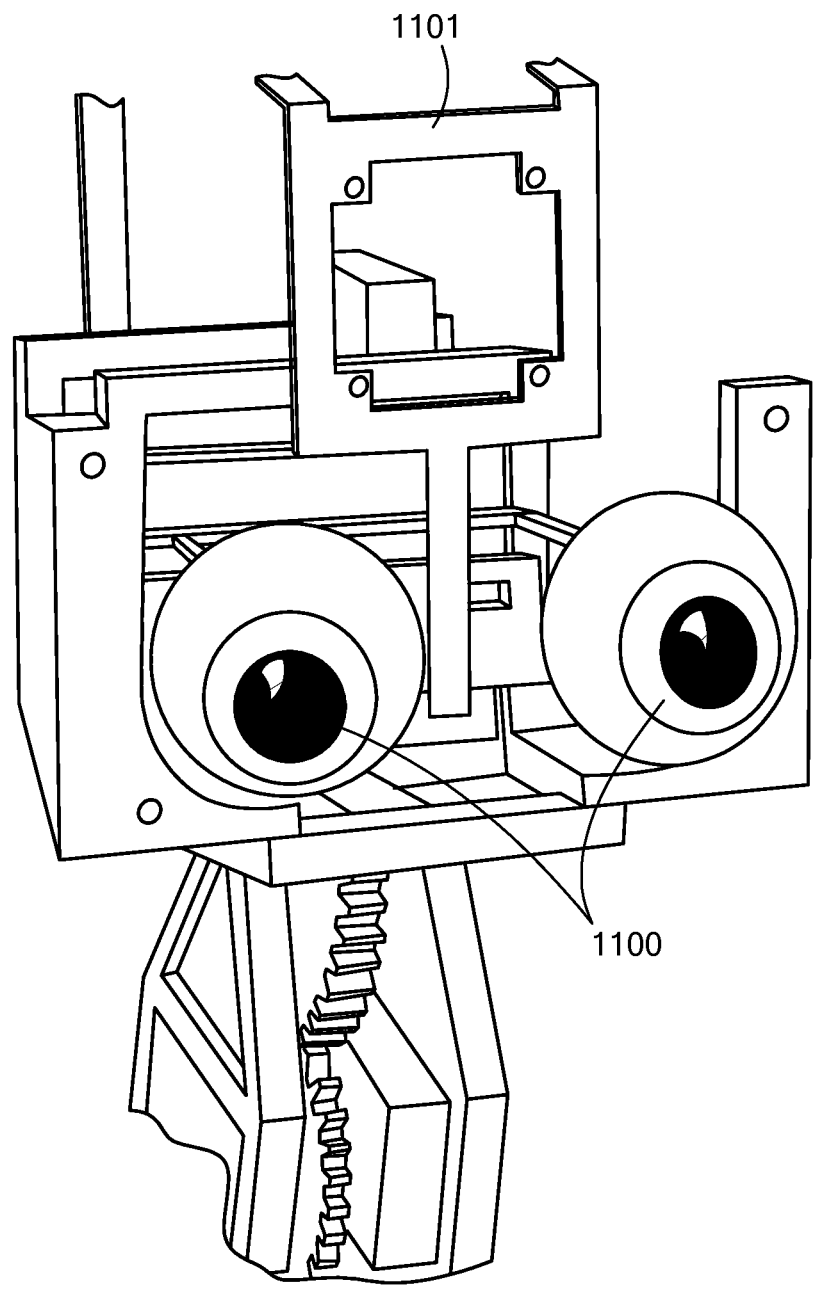
FIG. 11 depicts the head of a prototype robot without plastic shells in accordance with an embodiment of the present invention. Some of the eye and neck mechanisms can be observed. The square mounting bracket at the top is for the camera.
Figure 14:
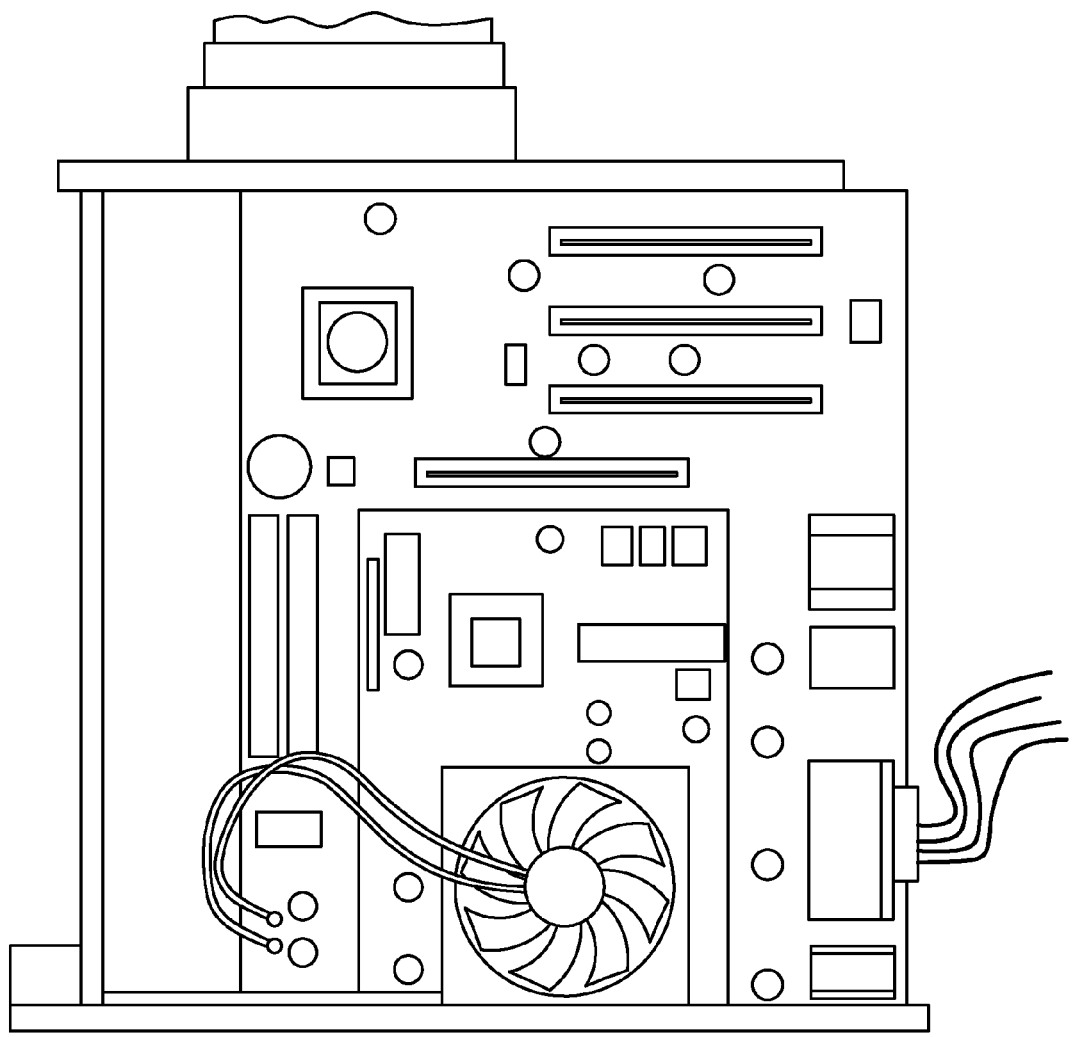
FIG. 14 is a view of the front of the prototype robot of FIG. 11 with shells removed. A computer motherboard can be seen which is connected to fans, a power supply, an audio output board, a motor control board, and a hard drive on the back.

FIG. 14 is a view of the front of the prototype robot of FIG. 11 with shells removed. A computer motherboard can be seen which is connected to fans, power supply, audio output board, motor control board, and hard drive on the back.

All of the components of the robot described above were assembled to create the complete system. Each robot has approximately 270 parts. Once the frame is together, all of the electronic components are attached (FIG. 14). The head and eyes are then attached. Finally, The painted shells are attached and all motors are calibrated.

Figure 8:
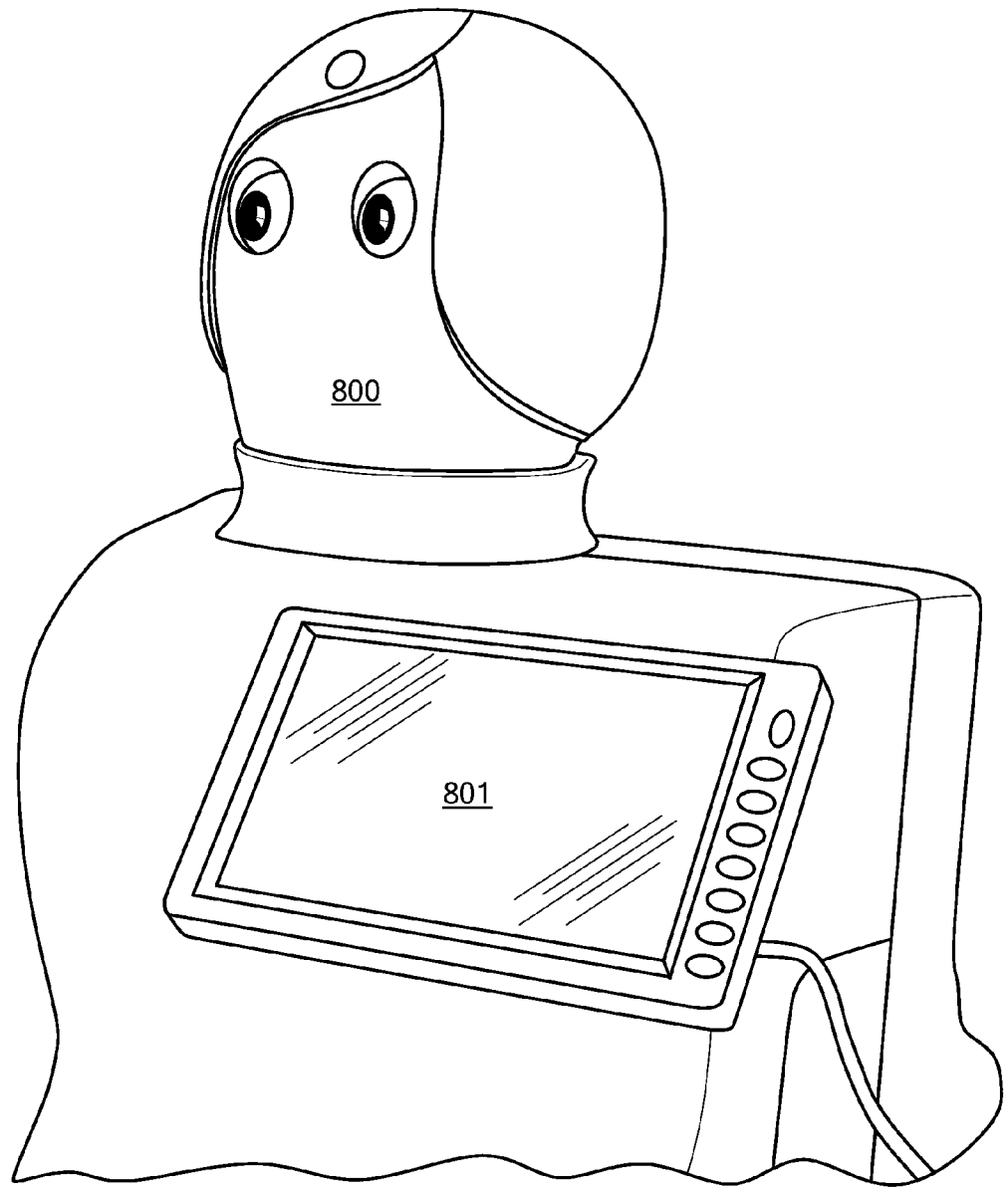
FIG. 8 depicts a fully-assembled prototype robot in accordance with an embodiment of the present invention. This version is approximately 20 inches tall, has 4 degrees of freedom, and a touch screen on the front.
Figure 10:
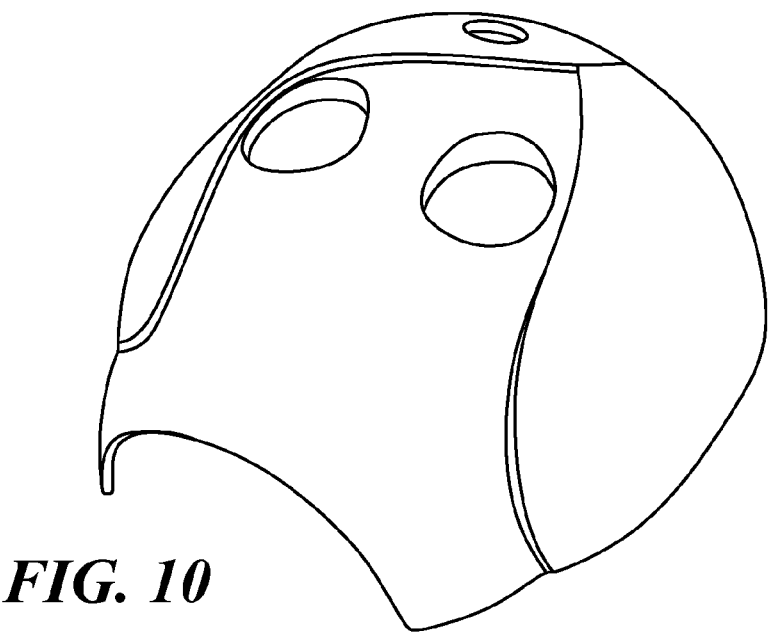
FIG. 10 depicts one of the plastic shells molded to fit around the prototype robot of FIG. 8.

A fully assembled prototype robot 800 in accordance with an embodiment of the present invention is depicted in FIG. 8. This version is approximately 20 inches tall, has 4 degrees of freedom, and a touch screen 801 on the front. The molded shell used to make the head of the robot depicted in FIG. 8 is show in FIG. 10.

Figure 9:
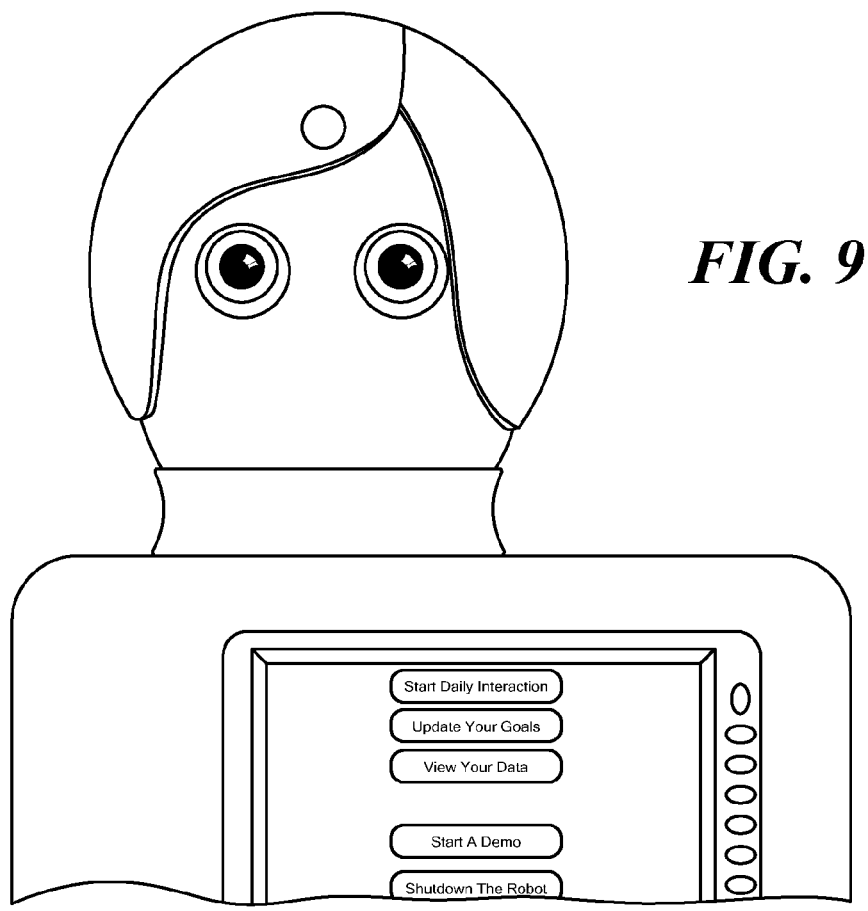
FIG. 9 is a straight-on view of the upper portion of the fully assembled prototype robot of FIG. 8.

FIG. 9 provides a front view of the robot 900 in accordance with an embodiment of the present invention. In this embodiment, the touch screen display 901 is integrated into the torso of robot 900.

Figure 24:
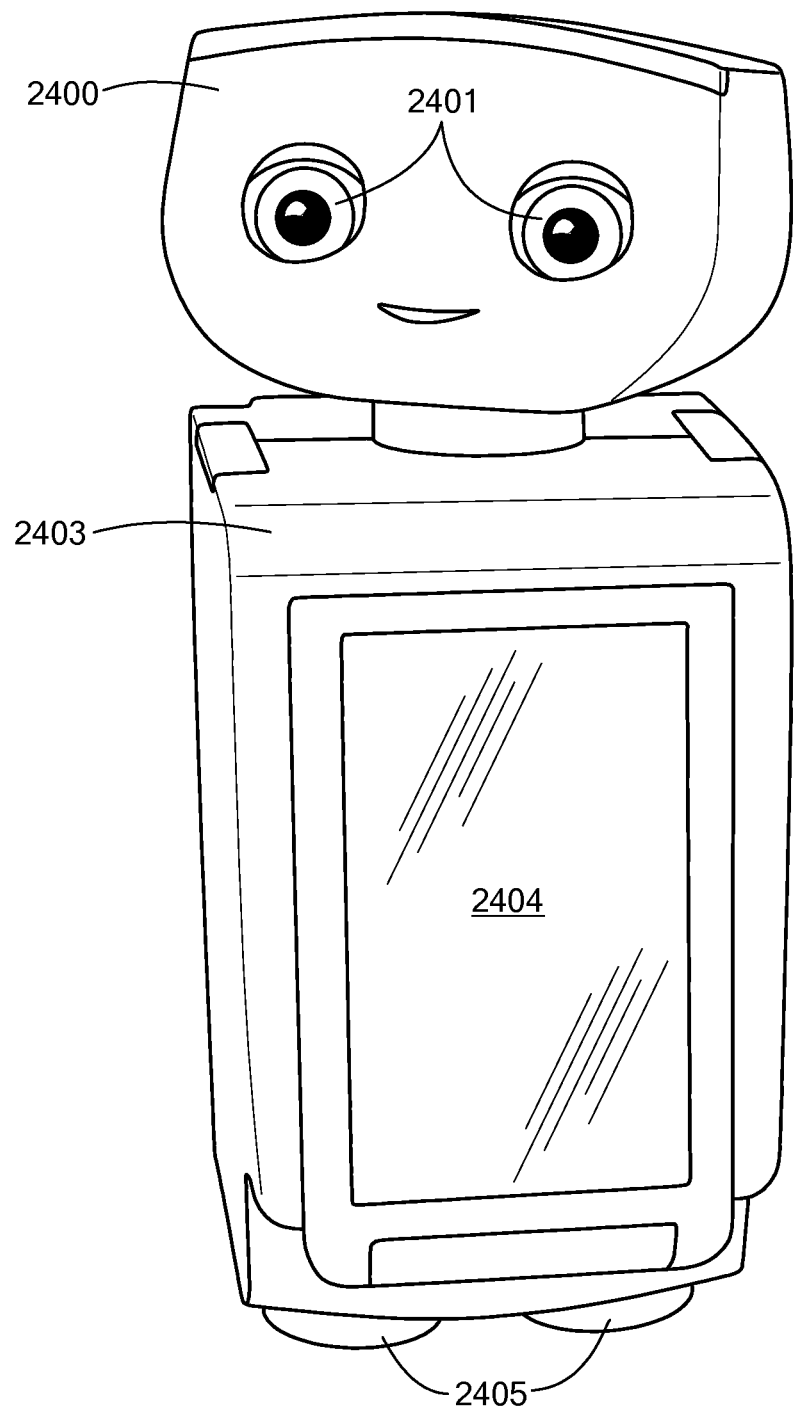
FIG. 24 depicts another fully assembled robot in accordance with an embodiment of the present invention.
Figure 25:
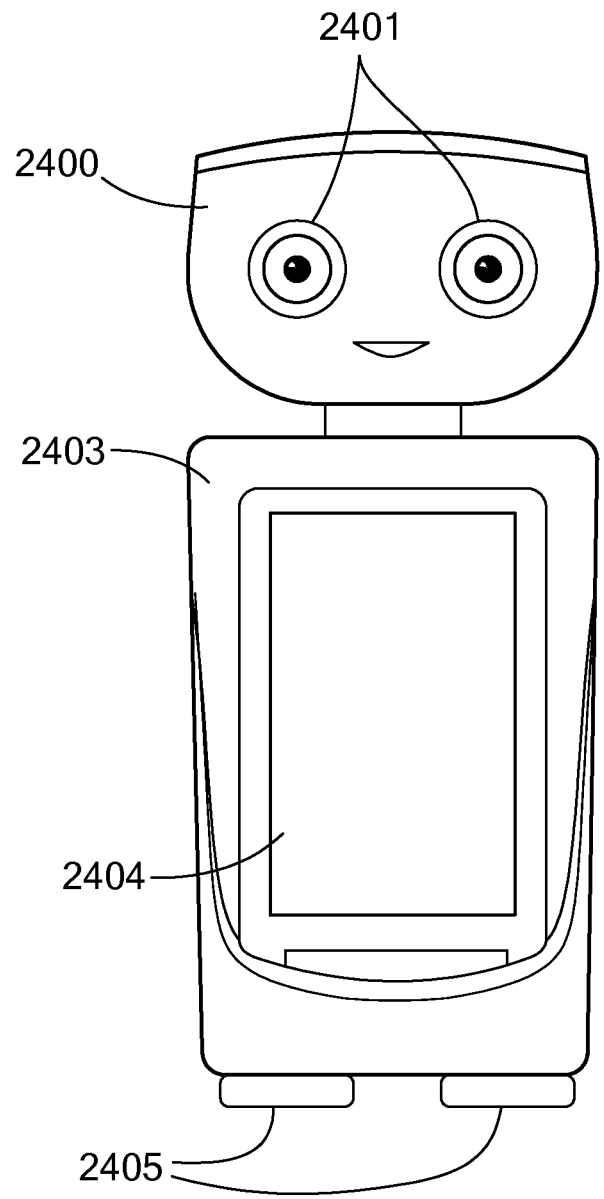
FIG. 25 depicts another view of the robot of FIG. 24.

FIG. 25 depicts another fully assembled robot 2403 in accordance with an embodiment of the present invention. The robot depicted in FIG. 24 includes a movable head 2400 and movable eyes 2401. Robot 2403 includes a touch screen display 2404 that is integrated into the body of the robot. The embodiment depicted also demonstrates feet 2405.

FIG. 25 depicts another view of the robot of FIG. 24. As noted with reference to this figure the eyes of the robot 2403 are large and depict a friendly demeanor to entice interaction of a user with the robot. The robot also includes smooth curves to make the robot appear friendly and approachable. Other features of the robot may be specified by the user or modified to provide different appearances. One of eyes houses a camera in this embodiment, which allows the robot to track the face of the users and move accordingly so that the robot is making eye contact with the user. The touch screen 2404 of the robot may be adjustable and provides direction as to the next action the user should undertake. The robot also includes motors in the head, neck and eyes to facilitate motion of these parts and provide the appropriate interaction.

Figure 26:
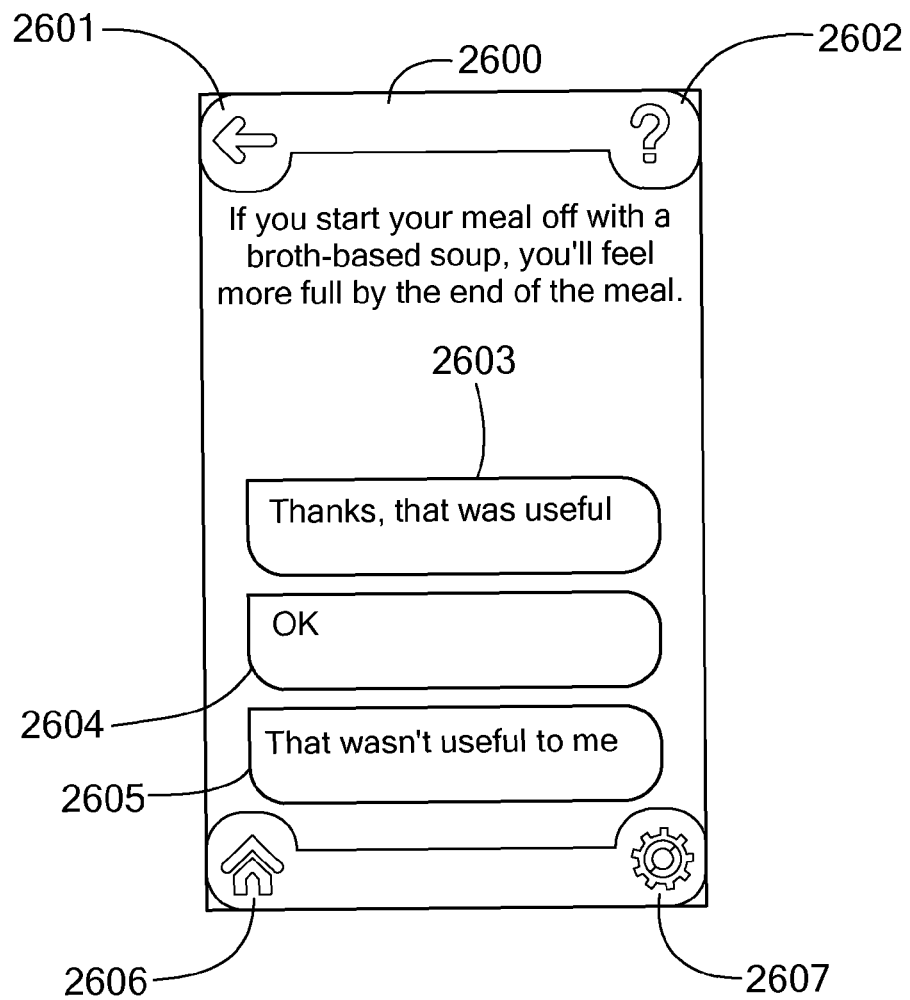
FIG. 26 illustrates a screen shot of a display in accordance with an embodiment of the present invention.

FIG. 26 illustrates a screen shot of a display in accordance with an embodiment of the present invention. The screen 2600 provides a back button 2601 that allows the user to go back through the conversation as necessary. The screen also provides a help button 2602 that will allow the user to obtain answers to questions she may have. The screen may provide various buttons, or selection regions such as 2603-2605, which allow the user to select various choices or prompts. The selected button may be highlighted or displayed in a different color when the user touches it to represent more clearly which choice the user has made. The screen may also provide a button 2606 that allows users to leave a certain region and return to a specified point. The screen may further include buttons such as button 2607 that allow the user to modify certain settings of the display screen or robot such as the brightness of the screen or volume of the robots voice as projected through speakers The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer controlled robot implemented method of assisting an individual in achieving a desired pattern of behavior, the robot including a processor, a camera, a head, eyes in the head and moveable relative to the head, and an interface for communicating with the individual, the interface including at least one of: a display, a speech interface and physical movement of the robot, the method comprising:
receiving data from the camera, the data representing a field of view of the camera;
detecting a location of a face of the individual within the field of view of the camera;
moving the eyes, relative to the head, based on the location of the face of the individual within the field of view of the camera, so as to make eye contact with the individual;
interacting with the individual via the interface in a plurality of interactions;
calculating, based on the plurality of interactions, a current state of a relationship with the individual;
implementing a behavior model for the robot's interaction with the individual; and
causing a change in interaction of the robot with the individual based on the current state of the relationship, so as to assist the individual in effecting the pattern of behavior.

2. A method according to claim 1, wherein the pattern of behavior relates to health of the individual.

3. A method according to claim 2, wherein the pattern of behavior relates to desired weight loss of the individual.

4. A method according to claim 1, wherein the desired pattern of behavior is long-term behavior.

5. A robot for assisting an individual in achieving a desired pattern of behavior, the system comprising:
a processor;
a head;
eyes in the head and moveable, relative to the head, under control of the processor;
a camera coupled to the processor; and
an interface configured to communicate with the individual, the interface being coupled to the processor and including at least one of: a display, a speech interface and physical movement of the robot;
wherein the processor is configured to:
receive data from the camera, the data representing a field of view of the camera;
detect a location of a face of the individual within the field of view of the camera;
move the eyes, relative to the head, based on the location of the face of the individual within the field of view of the camera, so as to make eye contact with the individual;
interact with the individual via the interface in a plurality of interactions;
calculate, based on the plurality of interactions, a current state of a relationship with the individual;
implement a behavior model for the robot's interaction with the individual; and
cause a change in interaction of the robot with the individual based on the current state of the relationship, so as to assist the individual in effecting the pattern of behavior.

6. A robot according to claim 5, wherein the pattern of behavior relates to health of the individual.

7. A robot according to claim 6, wherein the pattern of behavior relates to desired weight loss of the individual.

8. A robot according to claim 5, wherein the desired pattern of behavior is long-term behavior.

9. A method according to claim 1, wherein calculating the current state of the relationship comprises calculating a working alliance value, the value indicating an extent to which the individual and the robot work collaboratively and purposefully.

10. A method according to claim 9, further comprising:
storing a plurality of questions;
on each of a plurality of days, asking the individual a different subset of the stored plurality of questions;
receiving answers to the asked questions; and calculating the working alliance value based on the received answers.

11. A method according to claim 10, wherein storing the plurality of questions comprises storing a Working Alliance Inventory.

12. A robot according to claim 5, wherein the processor is configured to:
- calculate a working alliance value, the value indicating an extent to which the individual and the robot work collaboratively and purposefully; and
- calculate the current state of the relationship with the individual based at least in part on the calculated working alliance value.

13. A robot according to claim 12, wherein the processor is configured to:
- store a plurality of questions;
- on each of a plurality of days, ask the individual a different subset of the stored plurality of questions;
- receive answers to the asked questions; and
- calculate the working alliance value based on the received answers.

14. A robot according to claim 13, wherein the plurality of questions comprises a Working Alliance Inventory.

15. A method according to claim 1, wherein the robot includes a movable head controllable by the processor, and moving the eyes comprises moving the eyes at a first speed, the method further comprising:
- after moving the eyes, moving the head at speed less than the first speed and based on the location of the face of the individual, so as to face the movable head toward the face of the individual.

16. A robot according to claim according to claim 5, further comprising:
- a movable head controllably coupled to the processor; wherein the processor is configured to:
- move the eyes at a first speed; and
- after moving the eyes, move the head at a speed less than the first speed and based on the location of the face of the individual, so as to face the movable head toward the face of the individual.

\* \* \* \* \*